(12) United States Patent
Hoefelmayr

(10) Patent No.: US 8,485,047 B2
(45) Date of Patent: Jul. 16, 2013

(54) APPARATUS AND METHOD FOR MEASURING A QUANTITY OF MILK YIELDED BY AN ANIMAL DURING A MILKING PROCESS

(75) Inventor: Tilman Hoefelmayr, Niederteufen (CH)

(73) Assignee: Lactocorder AG, Niederteufen (CH)

( * ) Notice: Subject to any disclaimer, the term of this patent is extended or adjusted under 35 U.S.C. 154(b) by 121 days.

(21) Appl. No.: 12/998,672

(22) PCT Filed: Nov. 18, 2009

(86) PCT No.: PCT/EP2009/008206
§ 371 (c)(1),
(2), (4) Date: Aug. 15, 2011

(87) PCT Pub. No.: WO2010/057621
PCT Pub. Date: May 27, 2010

(65) Prior Publication Data
US 2011/0283810 A1    Nov. 24, 2011

(30) Foreign Application Priority Data
Nov. 18, 2008  (DE) .......................... 10 2008 057 819

(51) Int. Cl.
*G01F 1/22*  (2006.01)
(52) U.S. Cl.
USPC ..................................................... 73/861.53
(58) Field of Classification Search
USPC .. 73/861.53, 861.65, 223, 861.15; 119/14.17, 119/14.02
See application file for complete search history.

(56) References Cited

U.S. PATENT DOCUMENTS
3,919,975 A    11/1975  Duncan
4,452,176 A *   6/1984  Hoefelmayr et al. ...... 119/14.17
(Continued)

FOREIGN PATENT DOCUMENTS
CN    2935795 Y    8/2007
CN    101040168 A  9/2007
(Continued)

OTHER PUBLICATIONS
International Committee for Animal Recording (ICAR): International Agreement of Recording Practices, ICAR Guidelines approved by the General Assembly held in Kuopio, Finland on Jun. 9, 2006 (505 pages).
(Continued)

*Primary Examiner* — Jewel V Thompson
(74) *Attorney, Agent, or Firm* — Flynn, Thiel, Boutell & Tanis, P.C.

(57) ABSTRACT

An apparatus for measuring a quantity of milk yielded by an animal during a milking process comprises a container, a supply unit, a discharge unit, a filling level measuring device, a control unit and an evaluation unit. The supply unit is configured to feed milk into the container and can be connected to the milking unit of a milking machine. The discharge unit is configured to discharge milk from the container and can be connected to the milking line of the milking machine, which is adapted to have applied thereto a milking vacuum. The discharge unit comprises the means for changing the size of a discharge opening through which the milk flows when it is being discharged from the container. The discharge opening allowing milk to flow through the discharge opening can be adjusted to at least two sizes. The filling level measuring device is configured to measure a filling level of the milk in the container. The control unit is configured to control the means for changing the size of the discharge opening in dependence on the milk level in the container determined by the filling level measuring device, in order to adjust a size of the discharge opening such that the filling level remains within a predetermined range. The evaluation unit is configured to calculate a milk flow into the container on the basis of the set size of the discharge opening and of the filling level measured by the filling level measuring device.

26 Claims, 9 Drawing Sheets

U.S. PATENT DOCUMENTS

| | | | |
|---|---|---|---|
| 5,012,762 A | | 5/1991 | Moskvin |
| 5,313,833 A | * | 5/1994 | Hoefelmayr ............... 73/215 |
| 5,720,236 A | * | 2/1998 | Carrano et al. ........... 119/14.46 |
| 5,792,964 A | * | 8/1998 | van den Berg ............ 73/861.15 |
| 6,497,143 B1 | | 12/2002 | Rinkewich |
| 8,342,123 B2 | * | 1/2013 | Springer et al. ........... 119/14.02 |
| 2003/0075110 A1 | | 4/2003 | Clarke et al. |

FOREIGN PATENT DOCUMENTS

| | | |
|---|---|---|
| DE | 31 01 302 A1 | 8/1982 |
| DE | 31 18 865 A1 | 12/1982 |
| DE | 10 2004 025 059 A1 | 12/2005 |
| EP | 0 382 852 A1 | 8/1990 |
| JP | 57-137815 | 8/1982 |
| JP | 59-90358 | 5/1984 |
| JP | 8-5420 | 1/1996 |
| JP | 9-189586 | 7/1997 |
| RU | 1780659 A1 | 12/1992 |
| RU | 2004100546 A | 6/2005 |
| RU | 2004103189 A | 6/2005 |
| SU | 71855 U1 | 2/1949 |
| WO | WO 82/03965 | 11/1982 |
| WO | WO 01/71292 A1 | 9/2001 |
| WO | WO 03/004137 A1 | 1/2003 |

OTHER PUBLICATIONS

Melken 2002, Sicherung der Milchqualitaet!, Lehrbuch fuer Landwirte, $2^{nd}$ Edition 2002 (136 pages).

3-A Sanitary Standards formulated by International Association of Milk, Food and Environmental Sanitarians, U.S. Public Health Service the Dairy Industry Committee Jul. 1, 1979 (14 pages).

International Search Report dated Jun. 15, 2010 (4 pages).

* cited by examiner

APPARATUS AND METHOD FOR MEASURING A QUANTITY OF MILK YIELDED BY AN ANIMAL DURING A MILKING PROCESS

The present invention relates to an apparatus and a method for measuring a quantity of milk yielded by an animal during a milking process.

In dairy farming, it can be an advantage to measure the quantity of milk yielded during a milking process by an animal, for example a cow, a sheep or a goat. Thereby, the performance of each single animal can be monitored, and the composition of the herd as well as the feeding of the animals can be adjusted in order to obtain a milk yield as high as possible.

An apparatus for determining the milk performance of cows according to the state of the art is described, for example, in DE 3118865 A1. Hereinafter, this apparatus will be described in detail with reference to FIG. 1.

The apparatus 100 comprises a conduit 111 through which the milk is sucked in together with air. The milk is collected in a collection container 113 into which the conduit 111 leads. At the bottom of collection container 113, a discharge conduit 114 is provided. The outlet line 114 leads into a collection line 112. Shortly before the mouth of the outlet line 114, a magnet valve 115 is located. At the upper side of the collection container 113, a tubing 116 is connected which transfers the vacuum in the collection line 112 via the collection container 113 to the suck-off conduit 111.

During operation of the apparatus 100, it is measured via electrodes 117, 119 whether the filling level in the collection container is above the height of the electrode 119 or below the height of the electrode 117. Once the milk reaches the electrode 119, the solenoid valve 115 is opened by a control unit 120. Once the electrode 117 is exposed, the solenoid valve 115 is closed. The time during which the solenoid valve 115 is open is measured, and from the measured time a quantity of milk yielded by the milked animal is calculated.

The line 114 of apparatus 100 is configured such that the milk flow passing through the discharge line 114 when the solenoid valve 115 is opened is greater than the maximum milk flow occurring during the milking process. Cows can produce a milk flow of up to 12 kg/min. If the milk flow is considerably smaller, the solenoid valve is opened only during very short time periods, and during a milking process only few opening and closing operations of the solenoid valve 115 may take place. Therefore, metering low milk flows may be difficult. This can be particularly the case if animals yielding considerably lower milk flows than 12 kg/min, as for example sheep or goats, are milked. Considerably smaller milk flows than during an intermediate stage may also occur at the beginning and at the end of the milking session. With cows, the limit between milking and over-milking (milking without substantially gaining milk therefrom) may be considered to be 200 g/min. This means that with cows, measuring small milk flows of down to 0.2 kg/min may be considered as being reasonable.

Moreover, the apparatus 100 only determines the total amount of milk yielded by the animal. The apparatus 100, due to its discontinuous operating mode, is not suitable for measuring variations of the milk flow during the milking process.

In the apparatus 100, the discharge line 114 is made relatively long in order to keep variations of the milk flow through the discharge line 114, caused by fluctuations of the filling level of the collection container 113, at a low level. This results in a relatively large structural height of apparatus 100, thereby limiting the transportability of apparatus 100.

Further prior at milk quantity measuring apparatuses are described in U.S. Pat. No. 3,919,975 A, U.S. Pat. No. 6,497,143 B1, DE 31 01 302 A1 and EP 0 382 852 A1.

It is an object of the invention to provide an apparatus and a method enabling a measurement of strongly varying milk flows.

A further object of the invention is to provide an apparatus and a method enabling measuring milk flows which occur during the milking process.

A further object of the invention is to provide a transportable apparatus for measuring a quantity of milk yielded by an animal during a milking process.

An apparatus for measuring a quantity of milk yielded by an animal during a milking process comprises a container, a supply unit, a discharge unit, a filling level measuring device, a control unit and an evaluation unit. The supply unit is configured to supply milk to the container and is connectable to a milking unit of a milking machine. The discharge unit is configured to discharge milk from the container and is connectable to a milking conduit of the milking machine which is adapted to have applied a milking vacuum thereto. The discharge unit comprises the means for changing a size of the discharge opening through which milk flows when it is discharged from the container. The discharge opening, which allows milk to flow therethrough when it is discharged from the container, is adjustable to at least two sizes. The filling level measuring device is configured to control the means for changing the size of the discharge opening in dependence on the filling level of milk in the container, determined by the filling level measuring device, in order to set a size of the discharge opening such that the filling level remains within a predetermined range. The evaluation unit is configured to calculate a milk flow into the container on the basis of the set size of the discharge opening and of the filling level measured by the filling level measuring device.

By setting the filling level in the predetermined range, which can be achieved by means of the control unit, the filling level measuring device and the means for changing the size of the discharge opening, the apparatus can be used for varying milk flows under similar operating conditions. Thus, the apparatus can not only be used in milking cows, where milk flows of up to 12 kg/min may occur, but also in milking other animals such as sheep or goats, where relatively small flows of 20 to 50 g/min at the milking end may occur.

The discharge from the container depends substantially on the hydrostatic pressure which the milk has at the discharge opening, said pressure being in turn a function of the filling level, and on the size of the discharge opening, and can be calculated on the basis of these values and/or by means of calibration. The milk flow into the container is substantially equal to a sum of the discharge from the container and the rise of the milk amount in the container per unit of time. The rise of the amount of milk in the container, which may also be negative if the filling level decreases, can be calculated from the temporal change of the filling level, if the form of the container is known. Consequently, the milk flow into the container during a milking process can be measured.

In some embodiments, the control unit is adapted to enlarge the discharge opening if the filling level of the container exceeds a predetermined upper threshold value, and to reduce the size of the discharge opening if the filling level is lower than a lower threshold value. The control unit can be adapted to determine, on the basis of the milk flow calculated by the evaluation unit, when the upper threshold value is exceeded and/or the lower threshold value is not reached, that in one of the at least two sizes of the discharge opening a balance between the milk flow into the container and the milk flow out of the container is established and, if this is the case, to adjust this size of the discharge opening.

By enlarging the discharge opening when the upper threshold value is exceeded and by reducing the discharge opening when the lower threshold value is underachieved, the filling level can be kept in a range of values in which exact measurements can be carried out. By setting a size of the discharge opening such that a balance between the milk flow into the container and the milk flow out of the container is established, a number of necessary adjusting operations of the size of the discharged opening can be reduced.

In some embodiments of the invention, the means for changing the size of the discharge opening can be configured such that three or more different sizes of the discharge opening, which allow milk to flow through the discharge opening, are adjustable. By providing two or more possible sizes of the discharge opening, it is easier to establish a balance between the milk flow into the container and the milk flow out of the container, since there exist more possibilities to adapt the size of the discharge opening to the momentary milk flow into the container.

In some embodiments of the invention, at least one or all of the adjustable sizes of the discharge opening allowing the milk to flow through the discharge opening can be configured such that, at a milk flow into the container lying in a sub-range of a range of 0.5 kg/min to 12 kg/min, a balance is established between the milk flow into the container and the milk flow out of the container when the filling level lies in the predetermined range. A measurement of milk flows in a range of 0.5 kg/min to 12 kg/min is often required in measuring the amount of milk yielded by a cow. By providing one or more adjustable sizes of the discharge opening allowing to establish a balance in a sub-range of this range particularly relevant for cows, it can be achieved that during the measuring process of the quantity of milk yielded by a cow over relatively long time periods the process can be performed while maintaining a balance between the supply into the container and the discharge from the container, thus requiring a very small number of switching operations for changing the size of the discharge opening. Thereby, in the case of an electrically operated apparatus, the power consumption of the apparatus can be reduced.

Furthermore, the evaluation unit can be adapted to determine the total amount of milk yielded by an animal during the milking process by temporal integration of a milk flow from the container, calculated on the basis of the size of the discharge opening and the filling level. Since in some embodiments the milk flow from the container can be determined with higher precision than the milk flow into the container, a particularly accurate measurement of the total amount of milk yielded by the animal can be obtained.

In some embodiments, the filling level measuring device comprises a pitot tube, a gas supply and a pressure measuring device. The pitot tube comprises a bottom end which is located in the interior of the container, below a minimum filling level of the container. The gas supply is adapted to feed a gas, in particular air, into the pitot tube so that the gas is discharged from the pitot tube at its bottom end. The pressure measuring device is adapted for measuring a differential pressure between the interior of the pitot tube and an area of the container above a maximum filling level.

When the gas is discharged from the bottom end of the pitot tube, it must not only overcome the pressure being present in the upper area of the container, which can be lower than the ambient air pressure due to the connection of the container to the milking conduit to which the milking vacuum is applied, but also the hydrostatic pressure of the milk at the bottom end of the pitot tube. The higher the filling level of the container, the higher is this pressure. Thus, in the pitot tube a pressure is established which is substantially equal to the sum of the pressure in the interior of the container and the hydrostatic pressure. However, in the area of the container above the maximum filling level where there is no milk, only the interior pressure of the container prevails. Thus, by measuring the differential pressure, the hydrostatic pressure of the milk can be determined, said pressure being a measure for the filling level of the container. The differential pressure is measured between two gases so that the pressure measuring device must not enter into contact with the milk. Thereby, a caseation and/or a calcification of the pressure measuring device, which could occur if the pressure measuring device would come into contact with the milk, can be prevented. Furthermore, by separating the pressure measuring device from those parts of the apparatus that come into contact with milk, the risk of a mechanical damage to the pressure measuring device can be reduced.

The gas supply can comprise an opening of the pitot tube which is in contact with the surroundings of the apparatus so that air from the surroundings is sucked into the pitot tube by the milking vacuum. Thus, the gas supply can be secured with a reduced complexity of the apparatus. The energy necessary for the gas supply is provided by the milking machine so that the apparatus does not need to have an energy source of its own for the gas supply.

The pitot tube can include at least one notch on an edge of its open bottom end. The gas can flow through the notch out of the pitot tube and can rise upward through the milk in the form of regular little bubbles. Thereby, irregular formations of bubbles, which could lead to pressure fluctuations in the pitot tube, can be avoided.

In some embodiments, the pressure measuring device comprises a differential pressure sensor adapted to measure a pressure gradient between a first portion of the differential pressure sensor and a second portion of the differential pressure sensor, a first conduit connecting the interior of the pitot tube to the first portion of the differential pressure sensor, and a second conduit connecting the area of the container above the maximum filling level to the second portion of the differential pressure sensor. In comparison to a measurement of the differential pressure with two pressure sensors that are independent from each other, the differential pressure sensor provides the possibility to prevent or at least reduce corruption of the measuring results due to slight differences between the pressure sensors, for example with regard to the linearity, the offset and the temperature course.

In some embodiments, an end of the first conduit in the interior of the pitot tube and/or an end of the second conduit in the interior of the container may have a drip projection. Thereby, a penetration of milk or cleaning liquids into the conduits, which might cause corruption of the pressure measurements and damage to the differential pressure sensor, can be prevented.

Between the first conduit and the differential pressure sensor and/or between the second conduit and the differential pressure sensor, a diaphragm made of a material which is permeable to gas and impermeable to liquids can be disposed. Thereby, the electronics of the differential pressure sensor can be protected against moisture, for example in the form of milky fog, cleaning liquid and/or condensation water.

Additionally, the apparatus can comprise a heating device for heating the differential pressure sensor. Thereby, the pressure measuring sensor can be kept at a temperature which is a little higher than the ambient temperature, in order to suppress the formation of condensation water on the pressure measuring sensor.

In some embodiments, the means for changing the size of the discharge opening can comprise a disk with at least two openings of a different size. The disk is disposed in front of an opening of the discharge unit and is movable relative to the opening of the discharge unit such that each of the at least two openings of the disk can be placed in front of the opening of the discharge unit by moving the disk so that the milk, when it is drained from the container, flows through one of the at least two openings of the disk disposed in front of the opening of the discharge unit. Furthermore, a disk driving means for moving the disk relative to the opening of the discharge unit can be provided.

Thus, the size of the discharge opening can be adjusted by placing one of the at least two openings, which has a desired size, in front of the discharge unit. Thereby, the size of the discharge opening can be set in discrete intervals, thus achieving a high precision of the adjusted size.

In some embodiments, the disk is rotatable about an axis perpendicular to a bottom face of the disk. The at least two openings of the disk are disposed around the axis, and the bottom face of the disk is in contact with a rim of the opening of the discharge unit.

Since a relatively small amount of energy is necessary for rotating the disk, in particular if milk, which has relatively good lubrication properties, is present at the bottom face of the disk and on the rim of the opening, the power consumption of the apparatus can be kept low, enabling a battery operation with small and lightweight batteries, and a relatively weak and therefore lightweight disk driving means can be used. Thereby, an easy-to-use and robust apparatus can be achieved.

The container can have a vertical direction. At least in an area of the container between a minimum filling level and a maximum filling level, a cross-sectional area of an interior space of the container in each plane which is perpendicular to the vertical direction and which intersects the container within the area can be constant, the axis about which the disk is rotatable being inclined towards the vertical direction of the container.

Due to the vertical direction of the container which is defined by the constancy of the cross-sectional area between the minimum and the maximum filling level and which, for example in the case of a cylindrical container, can be the axis of the cylinder, a standard orientation of the container during operation of the apparatus, wherein the vertical direction is perpendicular, is determined. By the inclination of the disk, a volume in the vicinity of the discharge opening can be provided in which only a small residual volume of milk can accumulate. Thus, a complete evacuation of the container at the end of the milking process can be facilitated.

In some embodiments, the axis about which the disk is rotatable, can be perpendicular to the vertical direction of the container. Thereby, the discharge unit can be mounted at the side wall of the container, thus enabling a reduction of the structural height of the apparatus.

In some embodiments, the disk comprises an area where no opening exists, and the disk is movable relative to the opening of the discharge unit such that the area of the disk, in which no opening exists, can be brought in front of the opening of the discharge unit by moving the disk, in order to close the opening of the discharge unit.

Thereby, the discharge of liquid from the container can substantially be completely prevented. This can be used to measure relatively small milk flows which may occur, for example, at the end of the milking process with sheep and goats. With small milk flows, the drainage from the container can substantially be completely prevented, and the milk flow can be determined on the basis of the rise of the filling level in the container. When milking animals which yield a total quantity of milk in the milking process that is smaller than the volume of the container of the apparatus, the discharge opening can also remain closed during the whole milking process. At small milk flows, an improved measuring precision can be achieved by measuring with a closed discharge opening, as compared to measuring with an open discharge opening.

The possibility to substantially completely close the opening of the discharge unit, can also be used when cleaning the apparatus, in order to alternately fill the container substantially completely with a cleaning liquid, e.g. water, the discharge opening being closed, and to empty the same by opening the discharge opening. Thereby, even with relatively small quantities of water, an effective cleaning of the apparatus can be achieved.

The area of the disk in which no opening exists can be disposed near the largest of the at least two openings. Thereby, switching between a closed discharge opening and a maximally opened discharge opening can be done quickly, which allows the container to be evacuated rapidly after finishing the milking procedure and when cleaning the apparatus.

In some embodiments, the disk has a plurality of openings whose size is configured such that flow rates of the milk through two adjacent openings, respectively, at a predetermined filling level of the container, differ from each other by a predetermined flow rate difference.

The flow rate difference between two adjacent openings has an influence on a reaction time, within which the decision has to be taken if the momentary size of the discharge opening is maintained or if a larger or smaller size of the discharge opening is to be set, by moving the disk such that an opening adjacent to the momentarily used opening of the disk is place in front of the opening of the discharge unit. When the difference of the flow rates between adjacent openings has the same value, the reaction time is independent from the milk flow into the container. Thereby, the control of the apparatus can be simplified.

A relation between a difference of a quantity of milk in the container at a maximum filling level and a quantity of milk in the container at a minimum filling level on the one hand and the flow rate difference on the other hand can be greater than approximately 20 seconds.

When at a minimum filling level of the container the size of the discharge opening is reduced by one stage, the time until the maximum filling level is reached, at which the switchover to a larger opening is carried out in order to keep the filling level within a measurable range, is determined at least approximately by the relation indicated above. Accordingly, the time until the minimum filling level is reached is also at least approximately determined by this relation at the switchover to a larger opening at a maximum filling level. When the relation is greater than approximately 20 seconds, the time between two successive switching operations can be greater than approximately 20 seconds so that a fast switch-over, which could imply a high power consumption of the apparatus, can be prevented.

In some embodiments, the means for changing the size of the discharge opening can comprise a shut-off means with an adjustable opening. Thereby, a substantially continuous adjustment of the size of the discharge opening is possible.

In some embodiments, the means for changing the size of the discharge opening can comprise two or more openings of the container and two or more closing mechanisms. Each of the closing mechanisms is adapted to close and expose an opening of the container allocated to the closing mechanism. The discharge opening is formed by the entirety of the exposed openings of the container. The control unit is adapted to control the closing mechanisms in order to adjust the size of the discharge opening by closing and/or exposing one or a plurality of the openings of the container.

In some embodiments, the means for changing the size of the discharge opening can comprise a disk. The disk is rotatable about an axis perpendicular to the lower face of the disk, which is disposed near an opening of the discharge unit. A radius of the disk from the axis to the rim of the disk increases as a function of an angle about the axis from a first value, which is smaller than or equal to a distance from the axis to a rim of the opening of the discharge unit at the side facing the axis, to a second value, which is greater or equal to a distance from the axis to a rim of the opening of the discharge unit at the side facing away from the axis.

Depending on the position of the disk, the disk can expose or totally or partly cover the opening of the discharge unit. The larger the part of the opening covered by the disk is, the more the milk flow through the opening is restricted by the disk. The part of the opening of the discharge unit not covered by the disk forms a discharge opening whose size can be changed by rotating the disk about the axis.

The apparatus can comprise an inclination sensor, and the evaluation unit can be adapted to carry out a correction of the calculated milk flow on the basis of the inclination measured by the inclination sensor. Thereby, corruption of the measurement of the milk flow by holding the apparatus obliquely can be reduced.

The apparatus can additionally comprise a centrifuge head for separating milk and transport air, wherein the inlet of the centrifuge head is connectable to the milking cluster of the milking machine, and a milk outlet of the centrifuge head leads into the container. Furthermore, the apparatus can comprise a bypass line directing the air from the centrifuge head, at a side of the discharge opening facing away from the container, into the discharge unit. Thereby, corruptions of the measurement through admixtures of air in the milk and/or undesired pressure differences upstream and downstream of the discharge opening can be reduced. Furthermore, in this manner flow losses caused by the apparatus can be reduced, thereby improving the milking speed and/or the quality of the milk.

In some embodiments, the discharge unit can comprise a collection chamber which comprises a first inlet which is connected to the discharge opening, a second inlet which is connected to the bypass opening, and an outlet connectable to the milking line of the milking machine. Furthermore, the apparatus can comprise a means for closing the outlet.

By closing the outlet of the collection chamber, the flow of air and milk through the apparatus can be interrupted, thus finishing the milking process. The termination of the milking process can thus be performed by means of the apparatus for measuring the quantity of milk yielded by the animal during milking whereby additional equipment, such as for example a vacuum shut-off valve or a pneumatic hose clamp, are no longer needed.

In some embodiments, the evaluation unit can be adapted to determine, for calculating the milk flow into the container, a temporal change of the quantity of milk in the container on the basis of a temporal change of the filling level in the container, to determine a discharge rate from the container on the basis of the size of the discharge opening and of the filling level, and to calculate a sum of the temporal change of the quantity of milk in the container and of the discharge rate. Thereby, a precise determination of the momentary milk flow into the container can be performed.

A method according to the invention for measuring a quantity of milk yielded by an animal during a milking process comprises supplying the milk yielded by the animal during the milking process into a container. The filling level of the milk in the container is measured. The size of a discharge opening, through which the milk can flow out of the container, is changed in dependence on the measured filling level of the milk in the container. To this purpose, a discharge opening is used, which is configured such that at least two different sizes of the discharge opening which allow milk to flow through the discharge opening are adjustable. The size of the discharge opening is set such that the filling level of the milk in the container remains within a predetermined range. The milk flow into the container is calculated on the basis of the set size of the discharge opening and of the filling level measured by the filling level measuring device.

In some embodiments, the size of the discharge opening is enlarged if the filling level of the container exceeds a predetermined upper threshold value, and the size of the discharge opening is reduced if the filling level of the container drops below a predetermined lower threshold value. If the upper threshold value is exceeded and/or the lower threshold value is not reached, it is determined on the basis of the calculated milk flow into the container if at one of the at least two sizes of the discharge opening, a balance between the milk flow into the container and the milk flow out of the container is established. If this is the case, this size of the discharge opening is set.

The discharge opening can be configured such that three or more different sizes of the discharge opening which allow milk to flow through the discharge opening can be set.

At least one or all the adjustable sizes of the discharge opening, which allow milk to flow through the discharge opening, can in some embodiments be configured such that, at a milk flow into the container in a sub-range of a range from 0.5 kg/min to 12 kg/min, a balance between the milk flow into the container and the milk flow from the container is established, a filling level being in the predetermined range.

Furthermore, by temporal integration of a milk flow from the container, calculated on the basis of the size of the discharge opening and of the filling level, a total quantity of milk yielded by the animal during the milking process can be determined.

The measurement of the filling level can be performed by means of a pitot tube having an open bottom end which is located below the minimum filling level in the interior of the container. A gas, in particular air, can be supplied to the interior of the pitot tube, so that the gas flows out of the pitot tube at a lower end thereof, and a differential pressure between the interior of the pitot tube and an area of the container above a maximum filling level can be measured. On the basis of the differential pressure, the filling level can be calculated.

The changing of the size of the discharge opening can comprise moving a disk with two or more openings of different size. The disk is mounted in front of an opening of the discharge unit. One of the openings of the disk is placed in front of the opening of the discharge unit, so that the milk can flow through the opening of the disk out of the container.

In some embodiments, the container can comprise two or more openings. The process of changing the size of the discharge opening can comprise closing and/or exposing one or a plurality of the openings of the container. In such embodiments, the discharge opening is constituted by the entirety of the exposed openings of the container.

In some embodiments, changing the size of the discharge opening comprises rotating a disk, which is rotatable about an axis perpendicular to the lower face of the disk. The axis is disposed near an opening of the discharge unit. A radius of the disk from the axis to the rim of the disk increases as a function of an angle about the axis from a first value, which is smaller than or equal to a distance from the axis to a rim of the opening of the discharge unit at the side facing the axis, to a second value, which is greater than or equal to a distance from the axis to a rim of the opening of the discharge unit at the side facing away from the axis.

The calculation of the milk flow can comprise determining a temporal change of the quantity of milk in the container on the basis of a temporal change of the filling level, and determining a discharge rate from the container on the basis of the size of the discharge opening and of the filling level, and a sum of the temporal change of the quantity of milk in the container and of the discharge rate can be calculated.

The inclination of the container can be measured, and a correction of the measured milk flow on the basis of the measured inclination can be carried out.

Embodiments of the invention will be described with reference to the accompanying drawings, in which.

DETAILED DESCRIPTION OF THE INVENTION

Figure 1:
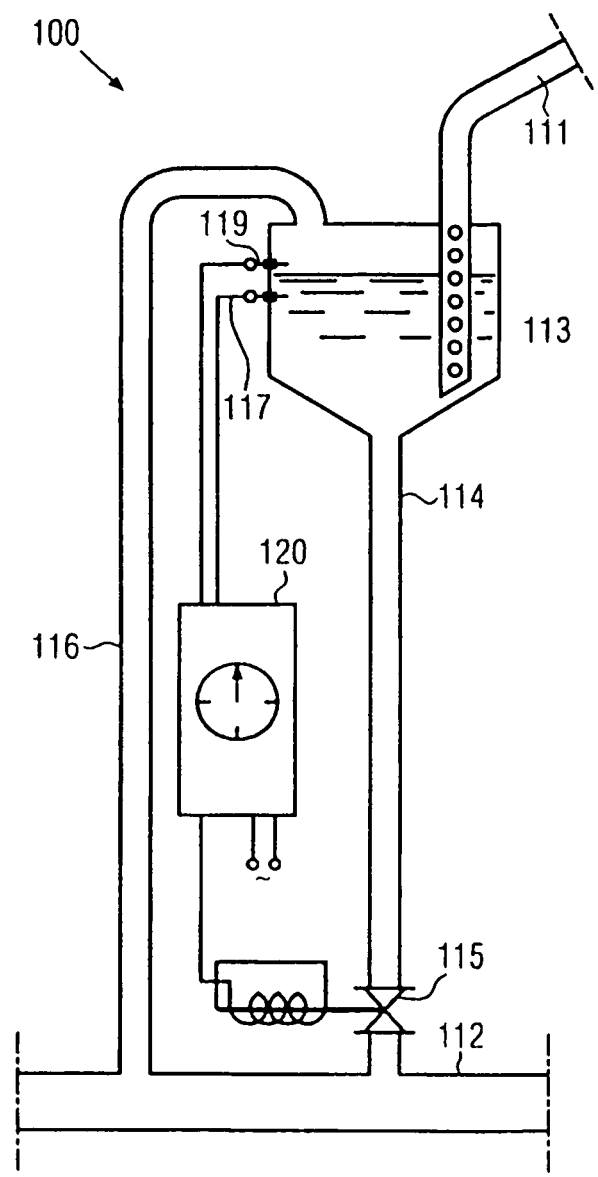
FIG. 1 is a schematic outline drawing of an apparatus for determining the milk yield of cows according to prior art.
Figure 2:
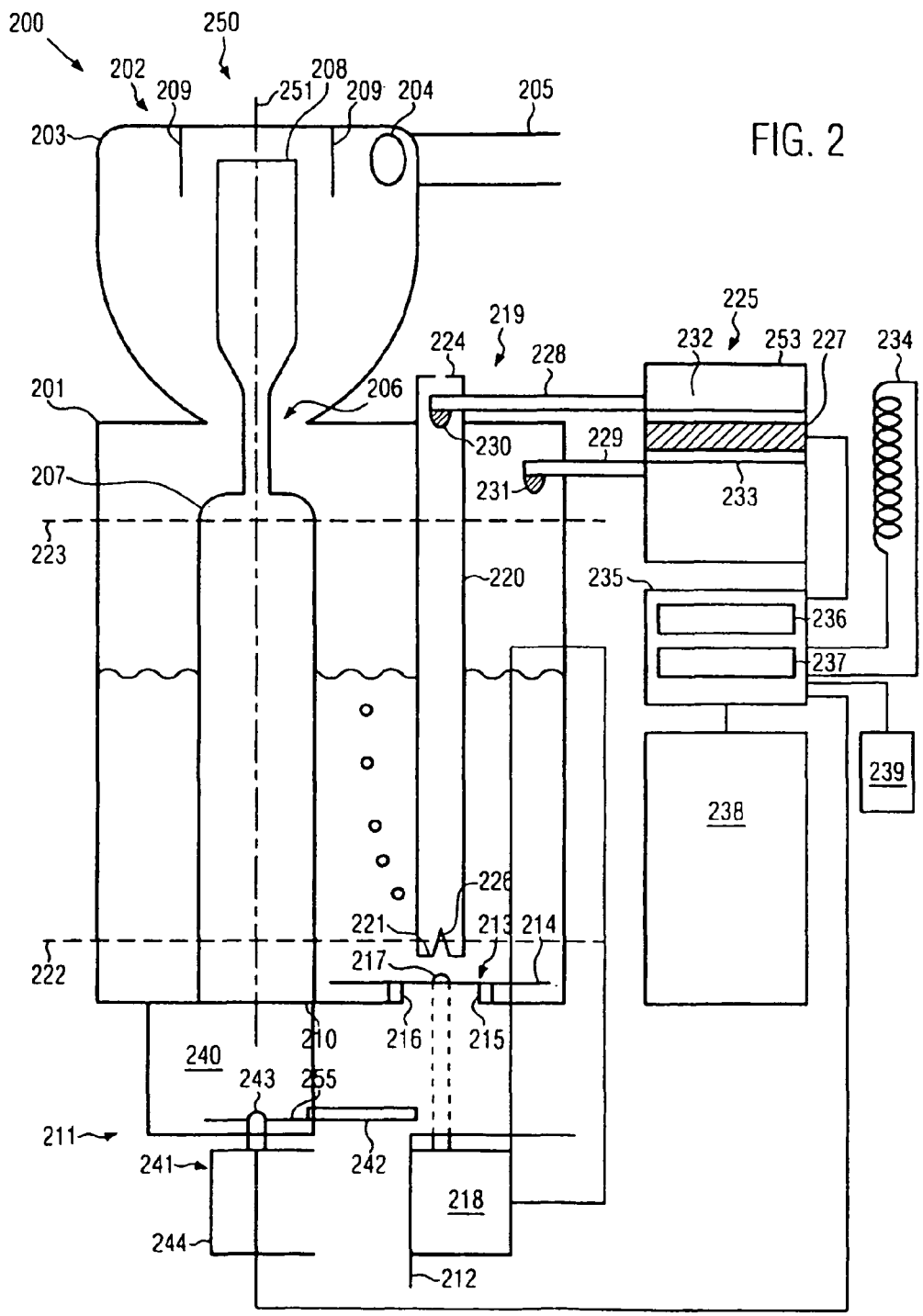
FIG. 2 is a schematic cross-sectional view of an apparatus for measuring the quantity of milk yielded by an animal during a milking process according to an embodiment of the present invention.
Figure 3:
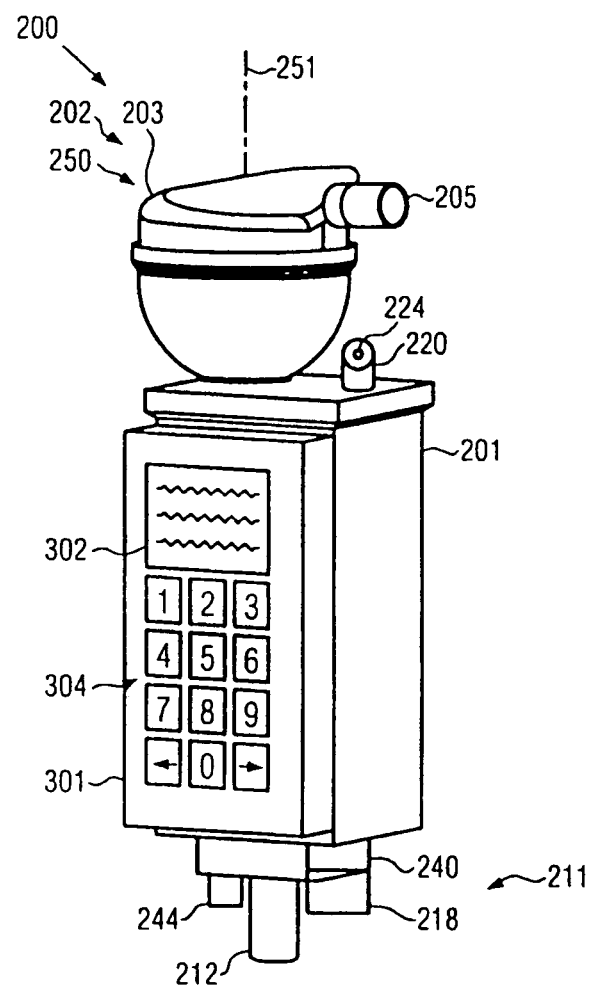
FIG. 3 is a schematic perspective view of an apparatus for measuring the quantity of milk yielded by an animal during a milking process according to an embodiment of the present invention.

FIG. 2 shows a schematic cross-sectional view of an apparatus 200 for measuring the quantity of milk yielded by an animal during a milking process according to an embodiment of the present invention. A schematic perspective view of the apparatus 200 is shown in FIG. 3.

The apparatus 200 comprises a container 201 adapted to receive milk therein.

Furthermore, the apparatus 200 comprises a supply unit 202 configured to feed milk into the container 201. The supply unit 202 is connectable to a milking unit of a milking machine via a port 205. Thereby, a mixture of milk and air can be supplied from the milking machine to the supply unit 202.

In some embodiments, the supply unit 202 can comprise a centrifuge head 250, suited for separating the air feeded in by the milking machine from the milk.

The centrifuge head 250 comprises a cup 203 which can have a substantially rotationally symmetric form with a symmetry axis 251. The port 205 ends in a inlet opening 204 in the upper part of the cups 203. At a lower end of the cups 203, there is located a milk discharge opening 206 through which the milk from the cup 203 can enter into the container 201. The cup 203 is tapered from the upper part, in which the inlet opening 204 is located, to the lower end, where the milk discharge opening 206 is located.

The inlet opening 204 is disposed such that the mixture of milk and air from the milking machine enters in a tangential direction, which can be substantially perpendicular to the symmetry axis 251 and be substantially parallel to an inner wall of the cups 203, into the interior of the centrifuge head 250. Thereby, a rotational movement of the mixture of milk and air about the symmetry axis 251 is obtained. During the rotational movement, the milk is pressed onto the inner wall of the cups 203 while the air, which has a lower density than milk, moves towards the symmetry axis 251.

The milk can flow through the milk discharge opening 206 into the container 201, as soon as its rotational speed, due to friction with the inner wall of the cups 203, has slowed down to such an extent that the gravitational force which draws the milk downwards, prevails over the centrifugal force which pulls the milk, due to the conical form of the cup 203, upwards.

The air can enter into an opening 208 at the upper end of a bypass line 207 which can be disposed such that the symmetry axis 251 extends through the opening 208. Due to an annular structure 209 which is disposed around the opening 208, it can be additionally prevented that milk droplets enter into the opening 208. Thus, since the milk is supplied to the container 201 while the air flows into the bypass line 207, a separation of milk and air can be effected.

In some embodiments can below the milk discharge opening 206 in the container 201, a distribution plate and/or a sieve grid (for the sake of clarity not represented in FIG. 2) can be provided. Features of the distribution plate and of the sieve grids are explained in more detail below with reference to FIG. 5.

The apparatus 200 further comprises a discharge unit 211, configured for discharging milk from the container 201. The discharge unit 211 can be connected via a port 212 with a milk line of the milking machine which, during the operation of the milking machine, has a milking vacuum applied thereto.

The discharge unit 211 comprises a collection chamber 240. A lower end 210 of the bypass line 207 leads into the collection chamber 240. The bypass line 207 can, in some embodiments, extend substantially vertically through the milk discharge opening 206 of the centrifuge head 250 and through the container 201. In the proximity of the milk discharge opening 206 the bypass line 207 can be narrowing. Thereby, a limitation of the milk flow through the milk discharge opening 206 caused by the bypass line 207 can be reduced. In other embodiments, the bypass line 207 can be disposed differently, which will be explained in more detail below with reference to FIG. 5.

The discharge unit 211 further comprises an opening 215 which leads at the bottom of the container 201 into the interior of the container 201. Milk from the interior of the container 201 can enter into the collection chamber 240 via the opening 215. Thereby, the milk and the air which have been separated in the centrifuge head 250 are brought together again in the collection chamber 240.

The collection chamber 240 is connected via the bypass line 207, the interior space of the centrifuge head 250 and the milk discharge opening 206 to the upper part of the container 201, so that a pressure balance between the collection chamber 240 and the container 201 can take place. When the port 212 is connected with a milking line of the milking machine, to which a milking vacuum is applied, the upper part of the container 201 is exposed to a pressure that substantially equals the milking vacuum.

When milk, which enters via the milk inlet opening 206 into the container 201, collects in the interior of container 201, the hydrostatic pressure exerted by milk is effective at the bottom of the container 201, additionally to the milking vacuum which prevails in the upper part of the container 201 above the surface of the milk. The higher the level of the milk in the container 201, the greater is the hydrostatic pressure.

Since the milking vacuum is applied to the collection chamber 240, a differential pressure exists between the side of the opening 215 in the interior of the container 201 and the side of the opening 215 in the collection chamber 240, said differential pressure being equal to the hydrostatic pressure of the milk in the container 20, irrespective of how strong the milking vacuum is. The pressure which drives the milk through the opening 215 is therefore substantially independent from the exact value of the milking vacuum, whereby effects of fluctuations of the milking vacuum on the milk flow through the opening 215 can be prevented.

The discharge unit 211 comprises means 213 for changing the size of a discharge opening through which the milk, when it is being discharged from the container 201, flows into the collection chamber 240.

Figure 4:
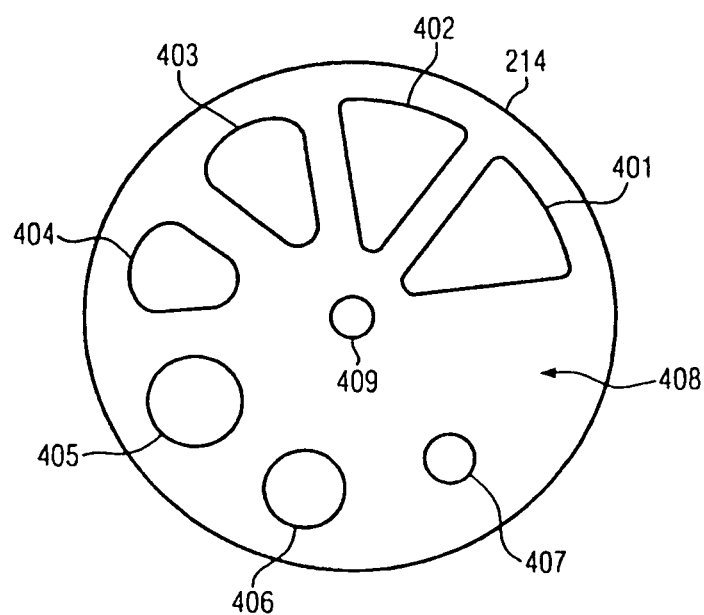
FIG. 4 is a schematic outline drawing of a disk which can be used with means for changing a size of a discharge opening in an apparatus according to the present invention.

In the embodiment shown in FIG. 2, the means 213 comprise a disk 214. A view of the disk 214 is shown in FIG. 4.

The disk 214 has a circular shape and comprises openings 401 to 407 disposed around the centre of disk 214. In the centre of disk 214, a borehole 409 can be provided through which the axis 217 on which the disk 214 is mounted and about which the disk 214 is rotatable, can be passed. The openings 401 to 407 have different sizes, wherein the size of the openings 401 to 407 decreases from the opening 401 to the opening 407 in a direction opposite to the clockwise direction. In other embodiments, the size of the openings 401 to 417 can also decrease in a clockwise direction.

The openings 401 to 407 can be located, respectively, in a sector of the disk 214. In the embodiment represented in FIG. 4, in seven out of eight sectors of substantially equal size of the disk 214, one of the openings 401 to 407 is located, whereas in the eighth sector 408, no opening is present. The eighth sector 408 forms an area of the disk where no opening is provided and which is disposed between the smallest opening 407 and the largest opening 401.

The disk must not comprise seven openings. In other embodiments, a larger or smaller number of openings can also be provided, wherein the number of openings can be more than or equal to two. In some embodiments, three or more openings can be provided. Likewise, the disk 214 must not be circular. In other embodiments it can, for example, have a polygonal shape.

The smaller ones among the openings 401 to 407, for example the openings 405, 406 and 407, can be substantially circular whereas the larger openings 401 to 404 can have an elongated shape tapering towards the centre of the disk 214. Thereby, within the limits of the sectors of disk 214 a larger cross-sectional area among the openings 401 to 417 can be provided than would be possible with the same number of sectors and the same radius of the disk 214 with circular openings. In other embodiments, however, all the openings 401 to 407 can be circular or have another shape.

The disk 214 is disposed in front of the opening 215. The lower face of the disk can be in contact with a rim of the opening 215, whereby it can be prevented that milk flows through the space between the disk and the rim of the opening 215 out of the container 201 and into the collection chamber 240. The opening 215 can, in some embodiments, be disposed at the end of a protrusion 216 at the bottom of the container 201. Thereby, in comparison to embodiments in which the disk 214 rests on the bottom of the container 201, a contact surface between the disk 214 and the rim 216 of the opening 215 can be reduced, and consequently a friction between the disk 214 and the rim of the opening 215 can be reduced. Furthermore, a hygienically critical development of a lubricant film between the disk 214 and the rim 216 of the opening 215 can be substantially prevented or at least reduced, since a relatively great part of the side of the disk 214 which faces the opening 215 can be flushed by a liquid, and due to the rotation of the disk 214, liquid between the disk 214 and the rim 216 of the opening 216 can be exchanged.

The disk 214 can be rotated about an axis 217 perpendicular to a lower face of disk 214 by means of a disk driving means 218. The axis 217 can be mounted near the opening 215, wherein the distance between the axis 217 and the rim of the opening 215 facing the axis 217 can be smaller than the radius of the disk 214. Thereby, by rotating the disk 214, one of the openings 401 to 407 of the disk can be placed in front of the opening 215 of the discharge unit 211. The opening 215 can be shaped such that it can be completely covered by one of the sectors of disk 214, so that milk can flow through exactly one of the openings 401 to 407 which is being placed in front of opening 215, out of container 201 into collection chamber 240. In some embodiments, the opening 215 can have the shape of a sector of a circle whose centre coincides with the position of the axis 217, and whose opening angle can be equal to a relation between an angle of 360° and the number of the sectors of the disk 214.

The one of the openings 401 to 407 of the disk that is being placed in front of the opening 215 of the discharge unit 211 forms a discharge opening through which the milk can flow out of the container 201. The size of the discharge opening can be varied by rotating the disk 214 and by positioning another one of the openings 401 to 407 in front of the opening 215 of the discharge unit 211. The drainage of milk from the container 201 can be stopped by positioning the sector 408 without opening in front of the opening 215 of the discharge unit 211, so that the latter is substantially completely covered by the disk 214.

The disk driving means 218 can, in some embodiments, comprise a stepping motor wherein, in some embodiments, a gearing for providing a reduction between the rotational speed of the stepping motor and the rotational speed of the disk 214 can be provided. The disk driving means 218 can be configured such that the time period needed for positioning an opening adjacent to the opening momentarily disposed in front of the opening 215 of the disk 214 in front of opening 215 lies in the range of approximately 0.1 seconds to approximately 0.3 seconds. Due to the relatively good lubrication properties of milk and the relatively low pressure force on disk 214, which at most can be equal to the hydrostatic pressure on a sector of disk 214, and due to the relatively low inertia moment of disk 214, which in some embodiments can be made of stainless steel, can have a diameter of approximately 60 mm and a thickness of approximately 0.6 mm, this can also be achieved with relatively low-powered and lightweight stepping motors.

Due to the differential pressure between the milk at the bottom of the container 201 and the collection chamber 240 which, as explained above, is substantially equal to the hydrostatic pressure of the milk in the container 201, the milk flows through the discharge opening. Since the hydrostatic pressure increases when the filling level of the milk in the container 201 rises, the milk flow through the discharge opening increases with an increasing filling level. The milk flow through the discharge opening further depends on the size of the discharge opening, wherein the milk flow is growing with a larger discharge opening, the filling level being the same.

The milk flow through the discharge opening can be determined as a function of the filling level for each size adjustable with the aid of the means 213 for changing the size of the discharge opening.

In some embodiments, the filling level of the container 201 can be measured by the unit "mass of milk per unit area". If the milk were free of air bubbles, the filling height of the milk in the container 201 could be calculated on the basis of the filling level indicated in this unit, dividing it by the density of the milk. The milk in the container 201 can, however, contain a certain quantity of air bubbles which do not contribute substantially to the mass of the milk, since the density of air is much lower than the density of the milk. In the upper part of the container 201, a large number of air bubbles can be present, so that the milk has a foamy consistency. In the lower part of the container, a small number of air bubbles can be present, since air bubbles in the container 201 rise up due to their low density. Consequently, milk having a very small proportion of air bubbles can flow through the discharge opening. The milk flow through the discharge opening depends on the differential pressure between the milk at the bottom of the container 201 and the collection chamber 240 which in turn is determined by the weight force of the liquid column bearing on the bottom of the container. Due to the negligible weight of the air bubbles, their contribution to the differential pressure can be ignored. Therefore, the differential pressure depends substantially on the mass of milk per unit area, whereas the filling height additionally depends on the number and size of the air bubbles and on the density of the milk, which can be different with the different species of animals.

Thus, the milk flow through the discharge opening can be determined more exactly if it is determined as a function of the filling level measured by mass of milk per unit area.

The flow through the discharge opening can, at least approximately, be proportional to the square root of the filling level s of the milk in the container 201. The proportionality constant can be determined experimentally by letting the milk flow out, during a determined time period through the discharge opening, the filling level being predetermined, and by measuring the quantity of the flown-out milk. The time period can be determined such that the quantity of milk flowing out is small as compared to the quantity of milk in the container 201, so that the filling level is only slightly changed by the outflow. The proportionality constant results then from a division of the measured quantity of milk by a product of the duration of the time periods and the square root of the predetermined filling level.

In other embodiments, the proportionality constant can be determined by measuring the quantity of milk flowing out during a determined time period at different filling levels, and a function of the following form $$M(s) = \Delta t \cdot a \cdot \sqrt{s} \qquad (1)$$

is fittet to the measured data. Therein, M(s) is the quantity of milk flowing out during the time period Δt the filling level s, and a is the searched-for proportionality constant.

The proportionality constant being known, the milk flow F through the discharge opening can be calculated on the basis of the filling level s according to the formula $$F = a \cdot \sqrt{s} \qquad (2)$$

The milk flow can be measured using the unit "mass of milk per time unit".

In other embodiments, another function can be fitted to the measured data. In further embodiments, the milk flow through the opening can be determined as a function of the filling level by theoretical calculations.

For each of the openings 401 to 407 of disk 214, due to the differing size of the openings 401 to 407, a different proportionality constant a results.

Furthermore, the apparatus 200 comprises a filling level measuring device 219. The filling level measuring device 219 can comprise a pitot tube 220. The pitot tube 220 has an open lower end 221 which is located in the interior of the container 201 below a filling height which is present at a minimum to-be measured filling level of the container 201 and which is represented in FIG. 2 by a dotted line 222, so that the lower end 221 of the pitot tube 220 lies below the milk surface, when the container is filled beyond the minimum filling level. At the upper end of the pitot tube 220, there is a gas supply 224 which comprises a shut-off means closing the pitot tube 220 at the upper end. The upper end 224 of the pitot tube 220 is located in the vicinity of the apparatus so that, due to the milking vacuum, air from the surroundings is sucked through the orifice into the pitot tube 220. The shut-off means can be dimensioned such that, at a differential pressure between the surroundings and the interior of the pitot tube of 50 kpa, which corresponds to a typical value for the milking vacuum, approximately one liter of air per minute flows into the pitot tube 220.

In other embodiments of the invention, air or another gas can be fed by means of a pump or a pressurized bottle into the pitot tube 220.

The air which enters via the throttle opening 224 into the pitot tube 220, exits therefrom at the lower end of the pitot tube 221. In some embodiments, at the lower end 221 of the pitot tube 220 a notch 226 can be provided, by which the formation of large bubbles can be suppressed whereby a uniform outflow of the air from the pitot tube 220 is achieved.

During the outflow of the air from the pitot tube 220, a pressure is built up in its interior that is substantially the same as the pressure of the milk at the bottom end of the pitot tube 220. The latter is equal to a sum of the hydrostatic pressure exerted by the milk and the pressure prevailing in the upper area of the container 201, above the milk surface.

The filling level measuring device 219 further comprises a pressure measuring device 225 configured to measure a differential pressure between the interior of the pitot tube 220 and an area of the container 201 above the maximum filling level, which is not exceeded at a regular operation of the apparatus 200. In FIG. 2, a filling height of the milk in the container is indicated by a dotted line 223, said filling height resulting from a typical proportion of air bubbles in the milk at the maximum filling level of the container 201. The differential pressure is equal to the hydrostatic pressure of the milk at the lower end of the pitot tube 220.

When the milk in the container 201 contains air bubbles, the contribution of air bubbles to the hydrostatic pressure of the milk can be ignored, since the density of air is much lower than the density of the surrounding milk. Thus, the hydrostatic pressure depends substantially on the mass of milk per unit area. On the basis of the differential pressure between the interior of the pitot tube 220 and the area of the container 201 above the maximum filling level, the filling level of the container can be calculated using the unit "mass of milk per unit area", for example by division of the measured differential pressure through the gravitational acceleration at the earth surface. In some embodiments, a correction factor can additionally be added, by which the distance of the lower end 221 of the pitot tube 220 from the bottom of the container 201 is taken into consideration.

The pressure measuring device 225 can comprise a differential pressure sensor 227 which is adapted to measure a differential pressure between a first portion of the pressure measuring sensor 227, in connection with an upper part of measuring volume 253, and a second portion of the pressure measuring sensor 253, in connection with a lower part of the measuring volume 253. The upper part of the measuring volume 253 is connected through a first conduit 228 with the interior of the pitot tube 220, and the lower part of the measuring volume 253 is connected through a second conduit 231 with an area of the container 201 above the filling height 223 existing at a maximum filling level. Thereby, a pressure is built up in the upper part of the measuring volume 253 that is substantially equal to the pressure in the interior of the pitot tube 220, and in the lower part of the measuring volume 253 a pressure is built up that is substantially equal to the pressure in the upper part of the container 201. Thereby, a differential pressure between the interior of the pitot tube 220 and the area of the container 201 above the maximum filling level 223 can be measured by means of the differential pressure sensor 217.

When measuring the differential pressures by means of the pressure measuring sensor 227, no contact between the pressure measuring sensor 227 and the milk is required, whereby a calcification and/or a caseation of the pressure measuring sensor 227 can be prevented. Furthermore, the pressure measuring sensor 227 in the interior of the measuring volume 227 can be securely accommodated, so that it is protected from damages, for example during the cleaning of the apparatus 200.

In some embodiments, a drip projection 230 can be provided at an end of the first conduit 228 in the interior of the pitot tube 220. Alternatively or additionally, a drip projection 231 can be provided at an end of the second conduit 229 in the interior of the container 201. Thereby, it can be prevented that milk or another liquid from the container 201 penetrates into the conduits 228, 229, for example if the milking vacuum is interrupted with the container 201 completely filled, or if the still moist apparatus 201 is not held perpendicularly but, for example, held upside down during transport.

If liquid would penetrate into the conduits 228, 229, vibrations of the liquid against the compressible air between the liquid and the pressure measuring sensor 217 could occur, whereby the air is alternately compressed and expanded. Thereby, disturbing fluctuations of the measured differential pressures could develop. Furthermore, a damage to the pressure measuring sensor 227 could occur at the penetration of liquid into the conduits 228, 229.

In some embodiments, the pressure measuring sensor 217 can further be protected against humidity by diaphragms 232, 233 made of a material permeable to gas and impermeable to liquids, such as Gore-Tex, Teflon or a sintered material. A space between the diaphragms 232, 233 and the pressure measuring sensor 227 can be kept small (it can have, e.g., a volume of approximately 0.02 to 0.1 ml), in order to keep the exchange of gas required for pressure balance between both sides of the diaphragms 232, 233 at a low level.

In some embodiments, the pressure measuring sensor 227 can be treated against moisture damages by an extremely creeping protective liquid such as parylen.

The filling level measuring device 219 can, in some embodiments, comprise a heating device 234 which is adapted to heat the differential pressure sensor 227 and optionally the whole measuring volume 253. The heating device 234 can, for example, comprise an electric heating resistance. By heating the differential pressure sensor 227 and/or the measuring volume 253, a generation of condensation water on the differential pressure sensor 227 and/or in the measuring volume 253 can be prevented or at least reduced.

In some of these embodiments, the measuring volume 253 can be surrounded by a heat insulation, the heating device being provided within the heat insulation. Thereby, the energy required for heating the measuring volume and/or the differential pressure sensor 227 can be reduced, which enables low energy operation of the apparatus 200.

The present invention is not limited to embodiments in which the filling level measuring device 219 is configured as described above.

In other embodiments, two absolute pressure-measuring sensors can be provided, one of which is located below the filling height 222 corresponding to the minimum filling level and the other is located above filling height 223 corresponding to the maximum filling level. The hydrostatic pressure of the milk, and thus the filling level, can be determined mathematically by differencing the pressures measured by the two absolute pressure measuring sensors.

In further embodiments, a differential pressure measuring sensor can be provided, one side of which is disposed at the bottom of the container 201, and the other side of which is connected via a conduit connection with an area of the container 201 above of the maximum filling level 223. Thereby, problems in the differencing process between two absolute pressure-measuring sensors, originating from differences of the two absolute pressure-measuring sensors, for example with regard to the linearity, to offset and to the temperature course, can be prevented.

In some of these embodiments, an elastic separating diaphragm can be provided between the differential pressure sensor and the interior space of the container 201, wherein the space between the elastic separating diaphragm and the differential pressure sensor can be filled with an oil, for example a silicon oil. Thereby, a direct contact between the milk and the differential pressure sensor, which could lead to calcification and/or caseation of the differential pressure sensor and to a risk of mechanical damage to the differential pressure sensor, can be prevented.

In other embodiments, the filling level of the container 201 can be measured by means of a plurality of single electrodes disposed at different distances from the bottom of the container 201, and which could be disposed, for example, at a side wall of the container 201. These single electrodes (measuring points) disposed in a level-staggered manner can cooperate with a common counter electrode which extends in the container vertically from the bottom to a filling height that can appear at a maximum filling level of the container 201, at a substantially constant distance from the single electrodes. Due to the electric conductivity of the milk, the electric resistance between a single electrode and the counter electrode is reduced if the single electrode is positioned below the surface of the milk. By comparing resistances measured between the counter electrode and the single electrodes, respectively, with a threshold value, it can thus be determined, which of the single electrodes is positioned below the surface of the milk.

The arrangement of the single electrodes being known, the filling height of the milk in the container 201 can be derived therefrom.

Since the conductivity of the milk decreases if air bubbles are in the milk, the respective proportion of air in the milk between the counter electrode and the single electrodes can furthermore be determined from the measured electric resistances, and therefrom the density of the milk can be determined. The resistances can be normalized to a value measured at the bottom of the container 201, in order to compensate differences in the conductivity of the pure milk. If such a measurement is carried out for all single electrodes, a density profile of the milk can be determined over the whole height profile in the container 201, the density of pure milk being known. By integration of the density profile over the height of the container, wherein above the filling height a density of zero prevails, the filling level in the unit "mass of milk per unit area" is obtained.

In further embodiments, the filling level can be determined by means of capacitive, conductive or inductive measuring methods, or with the aid of floats or buoyancy bodies or by ultrasonic means.

The apparatus 200 further comprises a control unit 236, configured to control the means 213 for changing the size of the discharge opening in dependence on the filling level of the milk in the container 201 determined by the filling level measuring device 219, in order to adjust the size of the discharge opening such that the filling level in a predetermined area, for example between the minimum filling level and the maximum filling level, is maintained.

The control unit 236 can be provided by an electronic module 235 which is supplied with energy by a battery 238, for example an accumulator. The electronic module 235 can be connected to the filling level measuring device 219. In embodiments, in which the filling level measuring device 219 is configured as described above with reference to FIG. 2, the electronic module 235 can be connected, in particular, with the differential pressure sensor 227 and the heating device 234, and can be adapted to calculate the filling level on the basis of the differential pressure measured by the differential pressure sensor 227 and to operate, if necessary, the heating device 234.

The electronic module 235 can further be connected with the means 213 for changing the size of the discharge opening. In embodiments, in which the means 213 are constructed as described above with reference to FIGS. 2 and 4, the electronic module can particularly be connected to the disk driving means 218, and can be adapted to control the latter for moving the disk 214.

In some embodiments, the control unit 236 can be adapted to control the means 213 for changing the size of the discharge opening such that the discharge opening is enlarged when the filling level of the container exceeds a predetermined upper threshold value, and the discharge opening is reduced, when the filling level of the container falls below a predetermined lower threshold value.

In embodiments, in which the means 213 are configured as described above with reference to FIG. 2, the discharge opening can be enlarged, whereby the disk 214 is rotated such that another of the openings 401 to 407, which is larger than the opening disposed at that moment in front of the opening 215 of the discharge unit 211, is positioned in front of the opening 215. The discharge opening can be reduced by positioning a smaller one of the openings 401 to 407 in front of the opening 215 of the discharge unit 211.

When the discharge opening is enlarged, the milk flow from the container 201 is increased. Thereby, the filling level of the container 201 can decrease, so that the filling level drops again under the upper threshold value. At very large milk flows into the container 201, it may happen that the filling level of the container, after the enlargement of the discharge opening, rises more slowly than before, or remains constant. In this case, the control unit 236 can further enhance the milk flow by another enlargement of the discharge opening. For example, this can be done if the milk flow, during a fixed time interval after the last enlargement of the discharge opening, does not drop below the upper threshold value. The size of the discharge opening can continue to be enlarged until the filling level drops below the upper threshold value.

When the discharge opening is reduced, the milk flow from the container 201 decreases. Thereby, the filling level can again rise above the lower threshold value. If the milk flow should not rise within a fixed time interval above the lower threshold value, which can occur at very small milk flows, the discharge opening can continue to be reduced until the lower threshold value is again exceeded. In some embodiments, the discharge opening can also be totally closed if the lower threshold value is not reached for a longer time period, for example by positioning the sector 408, without opening the disk 214, in front of the opening 215 of the discharge unit 211.

In some embodiments, the upper threshold value can be equal to the maximum filling level 223, and the lower threshold value can be equal to the minimum filling level 222. In other embodiments; the upper threshold value can be smaller than the maximum filling level 223, and the lower threshold value can be greater than the minimum filling level. For example, the upper threshold value can amount to approximately 90% of the maximum filling level, and the lower threshold value can be approximately 110% of the minimum threshold value. Thereby, even a slight exceedance of the maximum filling level and a degression below the minimum filling level can be prevented.

In some embodiments, the minimum filling level can be defined as the filling level at which the milk in the container, with a minimum proportion of air bubbles being present in the milk during the operation of the apparatus 200, for example with substantially bubble-free milk, reaches up to the lower end of the pitot tube 220. In such embodiments, a degression below the minimum filling level can obstruct measurements of the filling level with the aid of the filling level measuring device 219, since in this case the lower end of the pitot tube may be situated above the surface of the milk, so that a pressure balance is no longer possible between the hydrostatic pressure of the milk and the gas pressure in the interior of the pitot tube 220. The maximum filling level can in some embodiments be defined as the filling level at which the milk, with a maximum proportion of air bubbles being present in the milk during the operation of the apparatus 200, which can be experimentally determined, reaches up to the opening of the conduit 231. In such embodiments, exceeding the maximum filling level can lead to a penetration of milk into the conduit 231 and to a soiling of the differential pressure measuring sensor 227.

An enlargement of the discharge opening when the upper threshold value, which is smaller than the maximum filling level, is exceeded, can therefore be helpful in preventing soiling of the differential pressure sensor 227 by milk, and a reduction of the discharge opening when the lower threshold value, which is greater than the minimum filling level, is not reached, can be helpful in securing a continuous measurability of the filling levels by means of the filling level measuring device 219.

As mentioned above, the milk flow through the discharge opening of the container 201 depends on the size of the discharge opening and the filling level of the container 201, wherein at a higher filling level a stronger milk flow can be obtained. When the milk flow from the supply unit 202 into the container 201 is situated in a range between the milk flow which is obtained at the set size of the discharge opening at the minimum filling level 222, and the milk flow which is obtained at the set size of the discharge opening with the maximum filling level 223, a balance can therefore be established, wherein the filling level takes a value between the minimum filling level 222 and the maximum filling level 223. At this value, the supply into the container 201 and the discharge from the container 202 are substantially equal. By changing the size of the discharge opening, the range within which a balance state can be established can be varied.

Due to the change of the size of the discharge opening carried out by the control unit 236, the size of the discharge opening can be varied until the discharge opening has such a size that a balance state can be established between supply and discharge, or that only relatively slow changes of the filling levels of the container 201 take place. Thereby, frequent changes of the size of the discharge opening can be prevented or at least reduced.

In some embodiments, the discharge opening can be closed at the beginning of the milking process. The milk flow into the container 201 will then lead to a rise of the filling level of the container 201, on the basis of which the milk flow into the container 201 can be calculated, which will be explained in more detail below.

When during the milking process the upper threshold value of the filling levels is exceeded, a size of the discharge opening can be determined on the basis of the calculated milk flow with which, using the calculated milk flow, a balance state between the milk flow into the container 201 and the milk flow out of the container 201 can be established, wherein the filling level lies in the balance state between the lower and the upper threshold value. Subsequently, with the aid of the means 213, the determined size of the discharge opening can be set.

When at a later point of time the milk flow into the container 201 increases, it may occur that the upper threshold value is again exceeded. If, however, the milk flow into the container 201 decreases, it may happen that the lower threshold value is not attained.

In both cases, on the basis of the momentary milk flow which, as detailed below, can be calculated on the basis of the filling level and the momentary size of the discharge opening, a size of the discharge opening can be determined with which, at the momentary milk flow, a balance state between the milk flow into the container 201 and the milk flow out of the container 201 can be established, wherein the filling level lies in the balance state between the lower and the upper threshold value. Subsequently, with the aid of the means 213, the determined size of the discharge opening can be set.

In embodiments, in which the size of the discharge opening is varied, as explained above, by means of a disk 214 with a plurality of openings 401 to 407, there can be determined for each of the openings 401 to 407 a balance interval of milk flows at which a balance state with a filling level between the lower and the upper threshold value can be established. Therein, an upper limit of the intervals corresponds to a milk flow through the discharge opening at a filling level which is equal to the upper threshold value. A lower limit of the intervals corresponds to a milk flow through the discharge opening at a filling level which is equal to the lower threshold value.

In some embodiments, the balance intervals for some or all the openings 401 to 407 can be sub-ranges of a milk flow range of approximately 0.5 kg/min to approximately 12 kg/min.

In order to determine a size of the discharge opening wherein, at the momentary milk flow, a balance state can be established, one of the available sizes of the discharge opening can be selected, the momentary milk flow lying in the balance interval.

If the momentary milk flow does not lie in the balance interval with any of the available sizes of the discharge opening, when the upper threshold value is exceeded, the next larger opening of the openings 401 to 407 of the disk 214, as compared to the opening momentarily placed in front of the discharge opening 215, can be positioned in front of the opening 215. If thereafter, within a predetermined time interval, there is no degression below the upper threshold value, the next larger opening can again be switched to.

If the lower threshold value is not attained and no size of the discharge opening is available at which a balance state can be established, the next smaller opening of the openings 401 to 407 of the disk 214, as compared to the opening momentarily placed in front of the discharge opening 215, can be positioned in front of the opening 215. If thereafter, within the predetermined time interval, the lower threshold value is not exceeded, the next larger opening can again be switched to.

The present invention is not limited to embodiments in which the size to be set of the discharge opening is determined on the basis of the momentary milk flow. In other embodiments, due to measurements of the milk flow at different points of time, an extrapolation of the milk flow can be performed.

For example, in some embodiments, a linear extrapolation of the milk flow can be performed on the basis of a value of the momentary milk flow and a value of the milk flow measured at a point of time lying a predetermined time period back in the past. For this purpose, a linear function for the milk flow dependent on the time, which extends through the measured values, can be determined. In other embodiments, the extrapolation can also be performed on the basis of more than two measuring values, for example by fitting a linear function to the measured values, and a non-linear extrapolation can also be performed, for example by a square function fitted to the measuring values. In the extrapolation, on the basis of the presently measured milk flow and the measured milk flows in the past, a milk flow for a point of time lying in the future is estimated by incorporating the point of time lying in the future into the function adapted to the measured values.

The determination of the size of the discharge opening at which a balance state can be established, can then be performed as described above, wherein instead of the momentary milk flow the extrapolated value for the milk flow is used. Thereby, short-term changes of the milk flow can better be taken into account.

In some embodiments, the means 213 for changing the size of the discharge opening can be configured such that a set of sizes of the discharge opening can be set, making possible a reduction of the number of changes of the size of the discharge opening. In the embodiment described above with reference to FIG. 2, this can be done by an appropriate selection of the sizes of the openings 401 to 407, which in the following will be explained in more detail.

The sizes the openings 401 to 407 can be selected such that the flow rates of the milk through the openings at a predetermined filling level, for example at a mean filling level between the minimum filling level 222 and the maximum filling level, differ by a predetermined flow rate difference.

For example, the sizes of the openings 401 to 407 can be chosen such that at a filling level of the container 201 of 0.01 kg/cm², corresponding to a filling height of approximately 100 mm, flow rates of 10.5 kg/min, 9.0 kg/min, 7.5 kg/min, 6.0 kg/min, 4.5 kg/min, 3.0 kg/min and 1.5 kg/min result. By positioning the sector 408 without an opening in front of the opening 215 of the discharge unit 211, furthermore a flow rate of zero can be set which differs from the flow rate at the smallest opening 407 by 1.5 kg/min. The flow rates of adjacent sectors of the disk 214 including the sector 408 without opening, which are obtained at the predetermined filling level of 0.01 kg/cm², thus differ in this example by a predetermined flow rate difference of 1.5 kg/min.

An evaluation for the time period $t_{schalt}$ between successive switching operations between the openings 401 to 407 can be obtained according to following formula:

$$t_{shalt} \approx \frac{V_{max} - V_{min}}{\Delta F} \quad (3)$$

Therein, $V_{max}$ is the quantity of milk in the container 201 at a maximum filling level, and $V_{min}$ is the quantity of milk in the container 201 at a minimum filling level. $\Delta F$ is the flow rate difference between adjacent openings.

In the above-mentioned example, the maximum filling level can take a value of 0.015 kg/cm², corresponding to a filling height 223 of approximately 150 mm, and the minimum filling level can have a value of 0.003 kg/cm², corresponding to a filling height 222 of approximately 30 mm, wherein the difference of the quantities of milk in the container 201 at a maximum and a minimum filling level can be 650 g. If the milk flow at a minimum filling level of 30 mm is enhanced by switching to the next larger of the openings 401 to 407 by the flow rate difference of 1.5 kg/min, according to equation (3) a time period of approximately 26 seconds until the maximum filling level is reached, results therefrom. A corresponding time period until the minimum filling level is reached, results from a reduction of the flow rate by 1.5 kg/min at a maximum filling level. Due to the same flow rate difference between adjacent openings 401-407, this evaluation is independent from the set size of the discharge opening.

In embodiments of the present invention, the relation defined by equation (2) between the difference of the quantities of milk in the container 201 at a maximum and a minimum filling level and the flow rate difference can be greater than approximately 20 seconds. Thereby, it can be guaranteed that the time period between successive changes of sizes of the discharge opening is sufficiently long to prevent a rapid switch-over between adjacent openings 401-407 of the disk 214, which could lead to a relatively high power consumption of the apparatus 214.

The apparatus 200 further comprises an evaluation unit 237 which is adapted to calculate, on the basis of the set size of the discharge opening and of the filling level of the milk in the container 201 determined by the filling level measuring device 219, a milk flow into the container 201. The evaluation unit 237 can be provided by the electronic module 235 which can comprise a processor adapted to perform the calculation of the milk flow into the container 201.

Milk flowing from the supply unit 202 into the container 201 can either flow out therefrom through the discharge opening of the container 201 and into the collection chamber 240, or remain in the container 201. If more milk flows into the container 201 than out of it, this results in a rise of the filling level of the container 201. When the quantity of milk flowing in and out is equal, the filling level of the container 201 remains constant, and when the quantity of milk flowing out is greater than the quantity of milk flowing in, the filling level decreases.

Accordingly, the following equation applies:

$$F_{in} = \frac{ds}{dt} A + F \quad (4)$$

Therein, $F_{in}$ is the milk flow into the container, ds/dt is the temporal derivation of the filling level, A is the cross-sectional area of the container and F is the milk flow through the discharge opening.

The first term at the right side describes the difference between the quantity of milk flowing into the container 201 and the quantity of milk flowing out, which leads to a change of the filling level s, and F is the milk flow through the discharge opening.

The cross-sectional area A of the container 201 is a geometric size of the container 201 which can be calculated, the form of the container 201 being known. ds/dt can be calculated from the difference between the filling levels at two successive points of time, and F can be calculated on the basis of the size of the discharge opening of the container and the filling level, as explained in more detail above.

The evaluation unit 237 can be adapted to calculate the milk flow into the container 201 according to equation (4). In other embodiments, other approximation methods can be used. For example, the variation of the filling level in the container 201 can be ignored, and the milk flow can be approximately calculated by calculating a milk flow flowing through the discharge opening out of container 201 When in the container 201 as described above, a balance between inflow and outflow has established, or only a slow rise and fall of the filling level exists, a good precision can be achieved by such an approximation.

In some embodiments, the control unit 236 can be adapted to keep the filling level in the container 201 within a relatively narrow range, which can be achieved by setting the upper and the lower threshold value to values relatively close to each other. In such embodiments, since relatively small changes of the filling level occur, the milk flow into the container 201, in such embodiments, can be approximately equal to the milk flow out of the container 201, if the milk flow is averaged over a time period which is longer than the duration of time between successive changes of the size of the discharge opening. Alternatively or additionally to averaging, in such embodiments a particularly fine graduation of the settable sizes of the discharge opening can be provided, so that the change of the milk flow from the container 201 is relatively small when the size of the discharge opening is changed.

In some embodiments, before the milk flow into the container 201 is calculated, a temporal averaging of the filling levels measured by the filling level measuring device 219 can be performed. Thereby, high frequency portions of the measured filling level which can be caused, for example, by pressure surges of the vacuum pump of the milking machine and by milk droplets falling into the container 201, can be reduced. Due to the averaging, for example frequency portions of the signals from the differential pressure sensor 227, with frequencies above a limit value in the range of approximately 1 Hz to approximately 10 Hz, can be suppressed.

In some embodiments, the temporal averaging of the measured filling level can be performed with the aid of a voltage-frequency-transducer connected to the differential pressure sensor 217, which can be provided in the electronic module 235. Thereby, a simple and precise averaging can be achieved.

From the calculated milk flow into the container 201 a total amount of milk flown into the container 201 during the milking process can be calculated by integration, which can be substantially equal to a total quantity of milk yielded by the animal during the milking process. Thereby, the total quantity of milk can be determined. The integration can be performed by numeric integration of the milk flow into the container 201 calculated by the evaluation unit 237. The numeric integration can be performed by means of a processor provided in the electronic module 235.

In other embodiments, the total quantity of milk can also be determined by integration of the milk flow F through the discharge opening. Since the container 201 is empty at the beginning and at the end of the milking process, an integral of the milk flow from the container 201, obtained by the integration of the milk flow through the discharge opening, also corresponds to the yielded total amount of milk. Since the temporal derivation of the filling level, whose determination can be affected by a certain imprecision, is not considered in this integral, the total quantity of milk can thus be determined with improved precision.

The container 201 can have a high, slender form. For example, the container 201 can have a height of approximately 18 cm and a bottom face of approximately 55 cm². The height of the container 201 can be measured in the direction extending in FIG. 2 from top to bottom, and the bottom face can be measured in a horizontal plane in FIG. 2, which is perpendicular to the drawing plane of FIG. 2. Thereby, effects of a deviation of a vertical direction of the container 201 from the perpendicular direction can be kept small.

The vertical direction of the container 201 can, in some embodiments, be defined by the side walls of the container 201, which can be perpendicular. Other possibilities of the determination of the vertical direction of the container 201 are explained in more detail below with reference to FIG. 5.

In some embodiments, the apparatus 200 can comprise an inclination sensor 239 of a known type which can be connected to the electronic module 235 or can be provided therein. The inclination sensor can be adapted to measure an inclination of the vertical direction of the container 201 with respect to the perpendicular direction. The evaluation unit can correct the measured milk flow and/or the measured total quantity of milk on the basis of the inclination measured by the inclination sensor, for example by multiplication with a correction factor depending on the inclination. The correction factor for a determined inclination angle can be experimentally determined by supplying to the supply unit 202, the inclination angle being known, a known quantity of a liquid, for example milk, and by measuring the total quantity of milk measured by the apparatus 200. The correction factor then results from a relation between the quantity of liquid supplied to the apparatus 200 and the measured quantity of liquid. In the evaluation unit 237, a table of values with correction factors for different inclination angles and/or inclination directions can be stored, and the evaluation unit 237 can carry out the correction of the measured milk flow and the measured total quantity of milk by means of the table of values.

The apparatus 200 can comprise a device 241 for shutting off the port 212, connectable with the milking machine and leading into the collection chamber 240 and forming an outlet of the collection chambers 240. The device 241 can comprise a plate 242, which can be connected by a pivoted lever 255 to a rotation axis 243. The rotation axis 243 can be passed through the bottom of the collection chamber 240 and is rotatably and sealingly received therein. The pivoted lever 255 can be rotated around the axis 243 with the aid of a drive means 244 that can, for example, comprise a rotating magnet with a rotation angle in the range of approximately 10° to approximately 60. Thereby, the plate 242 can be moved in front of the mouth of port 212 in order to close the latter, or be moved away from it in order to expose the port 212.

The plate 242 can have an even, cylindrical form, be made of steel, plastics material or hard rubber and comprise a diameter of approximately 18 mm to approximately 20 mm and a height of approximately 3 mm. The mouth of the port 212 can have an inner diameter of 16 mm, so that it can be completely closed by the plate 242. The bottom of the collection chamber 240 can be substantially even, so that a substantially completely sealing closure of the port 212 can be achieved by the plate 242.

The device 241 can be used to close a connection between the milking machine and the milking unit at the end of the milking process, so that the milking vacuum does no longer act on the teats of the animal, and the milking cluster can be taken off. In some milking machines, this can be performed automatically. The device 241 can be used instead of known vacuum shut-off valves or pneumatic hose clamps provided for this purpose.

In some embodiments, the device 241 can be connected to the electronic module 235. The electronic module 235 can comprise means for controlling the device 241. These can be adapted to detect an end of the milking process on the basis of the milk flow into the container 241 measured by the evaluation unit 237, and to close the port 212 with the aid of the device 241 at detection of the end of the milking process. For detecting the end of the milking process, the measured milk flow can be compared with a threshold value, the milking process being considered as finished when there is degression below the threshold value.

The measuring volume 253 with the pressure measuring sensor 227, the heating device 234, the electronic module 235, the battery 238 and the inclination sensor 239 can be accommodated in an electronic compartment 301 which can be mounted at a side of the container 201. The battery 238 can be mounted extendably from below in the lower part of the electronic compartment 301. A lock of the battery 238 can be configured to be relatively frail, so that the battery 238 when the apparatus 200 falls down, will be released from its lock. Thereby, the risk that the apparatus 200 breaks at the impact with the bottom can be reduced. Furthermore, the battery 238 can be removed from the apparatus 200 for charging and can be charged independently from the apparatus 200. This can be a logistic advantage when using a large number of apparatuses 200, for example when milking a herd of goats, where for example 50 apparatuses 200 are simultaneously used.

The electronic compartment 301 can comprise a keyboard 304 and a display 302 for operating the apparatus 200 and for the output of measuring values by the apparatus 200.

Figure 5:
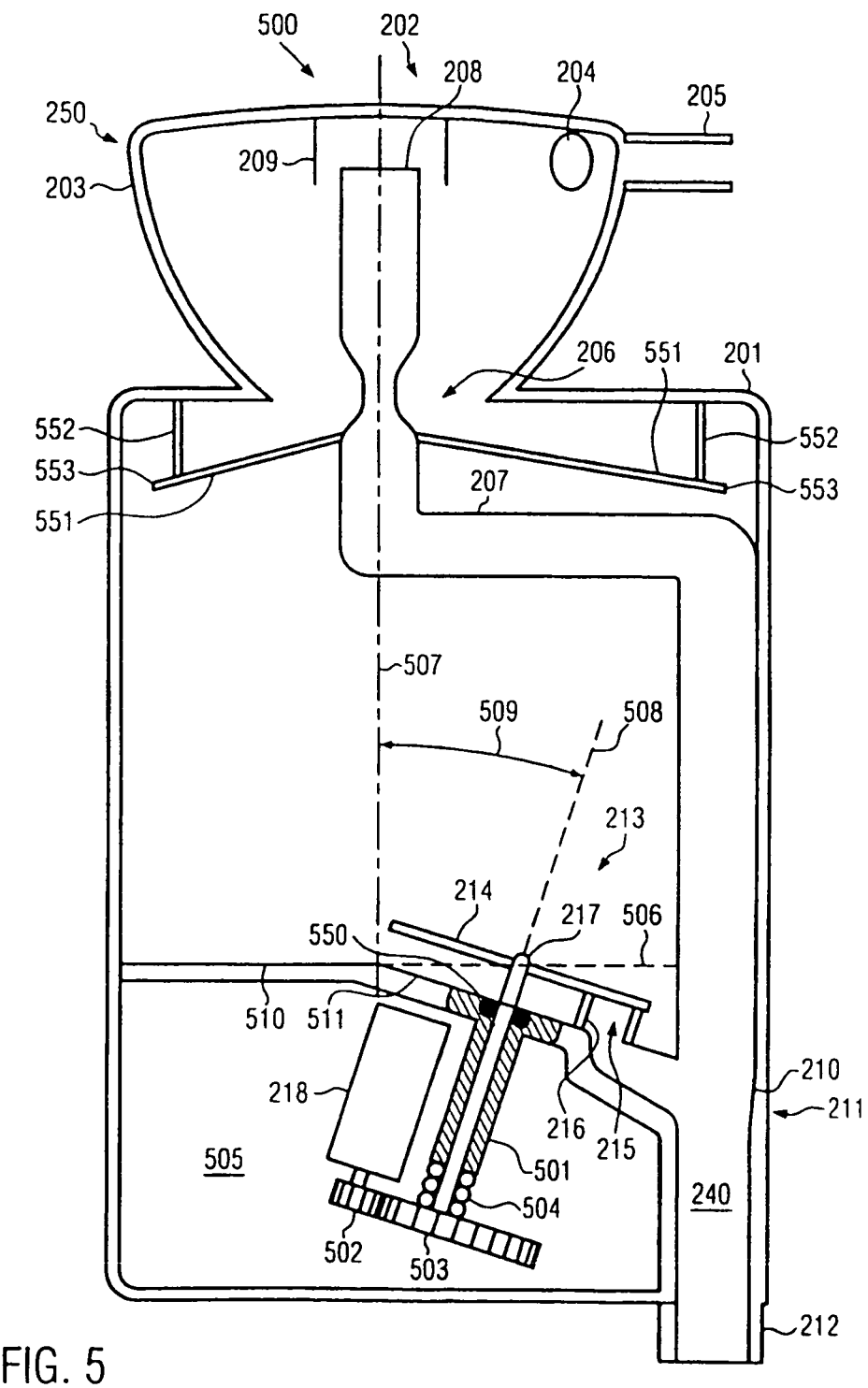
FIG. 5 is a schematic cross-sectional view of an apparatus for measuring the quantity of milk yielded by an animal during a milking process according to a further embodiment of the present invention.

FIG. 5 shows a schematic cross-sectional view of a further apparatus 500 according to the invention for measuring a quantity of milk yielded by an animal during a milking process. In FIG. 5 and in FIG. 2, the same reference numerals used to designate parts of the apparatuses 200 and 500 corresponding to each other. Furthermore, for the sake of clarity, in FIG. 5 some components of the apparatus 500 have not been drawn. In particular, the filling level measuring device 219, the electronic module 235 with the control unit 236 and the evaluation unit 237, the battery 238 and the inclination sensor 239 are not drawn in FIG. 5. However, the apparatus 500 can comprise similar components with features that correspond to the above-described features of the corresponding components, The apparatus 500 comprises a container 201. Furthermore, the apparatus 500 comprises a supply unit 202, which comprises a centrifuge head 250 with a cup 203, a port 205 connectable to a milking machine, a supply opening 204 and a milk discharge opening 206 which leads into the container 201. Features of the centrifuge head 250 and its parts can correspond to the features described above with reference to FIG. 2. Air, which is, mixed with milk, via the port 205 to the supply unit 202, can be passed through a bypass line 207 whose upper end 207 is disposed in the centrifuge head 250, while the milk flows through the milk discharge opening 206 into the container 201.

In the apparatus 500, the bypass line 207 does not extend vertically through the container as in the apparatus 200 described above with reference to FIG. 2 to 4. Instead, it is bent in the interior of the container 201 to a side wall of the container and is passed along the side wall downward. In some embodiments, the bypass line 207 can also be passed through the side wall of the container 201 or from the upper centre of the centrifuge head 203 upward or towards the side and along the outside of the container 201.

Below the milk discharge opening 206 of the centrifuge head 250, a distribution plate 551 of substantially horizontal, gable-roof or conical shape can be disposed in the container 201. The distribution plate 551 can have a larger radius than the milk discharge opening 206 so that milk which enters through the milk discharge opening 206 into the container 201, impinges on the distribution plate 551 and is directed therefrom to the side walls of the container 201.

The milk can flow between the distribution plate 551 and the side walls of the container 201 into the container 201. A distance between the rim 553 of the distribution plate 551 and the side walls of the container 201 can be configured such that a cross-sectional area of the region between the distribution plate 551 and the side faces is greater or equal to a cross-sectional area of the milk discharge opening 206. Thereby, it can be ensured that milk which flows through the milk discharge opening 206 into the container 201 can flow out between the distribution plate 551 and the side walls of the container 201. In some embodiments, the distance between the rim 553 of the distribution plate 551 and the side walls of the container 201 can take a value in a range of approximately 1.5 mm to approximately 3 mm, for example a value of approximately 2 mm.

By the rim 553 of the distribution plate 551 and the side walls of container 201, a transfer opening is defined through which milk flowing into the container 201 can flow to the side walls of the container 201 and flow along the side walls downward. Thereby, a particularly uniform and substantially impact-free milk transfer into the container 201 can be achieved, and a formation of foam in the container 201 can be reduced. Between the distribution plate 551 and the covering surface of the container, a sieve grid 552 can be placed which, in some embodiments, can be substantially vertical. By means of the sieve grid 552 impurities of the milk such as, for example, rests of straw, can be retained and collected in order to reduce soiling of the container 201. In some embodiments, the distribution plate 551 and the sieve grid 552 can be removable from the container 201 to enable easier cleaning of the distribution plate 552 and of the sieve grid 552.

The sieve grid 552 can, in some embodiments, be at a distance from the rim 553 of the distribution plate 551 to achieve a more homogeneous flow of the milk over the rim 553. In some embodiments, the sieve grid 552 can be at a distance of approximately 5 mm to approximately 7 mm from the rim 553 of the distribution plate 551.

Furthermore, the apparatus 500 comprises a discharge unit 211 which is configured to discharge milk from the container 201. The discharge unit 211 has an opening 215 through which the milk can flow from the container 201 into a collection chamber 240. A lower end 210 of the bypass line 207 leads into the collection chamber 240, so that milk and air in the collection chamber 240 are brought together again. By a port 212, the discharge unit 211 is connectable with a milking line of a milking machine to which a milking vacuum can be applied.

The discharge unit 211 comprises means 213 for changing the size of a discharge opening, through which the milk can flow from the container 201 into the collection chamber 240. Said means comprise a disk 214 which is disposed in front of the opening 215 of the discharge unit 211 and has at least two openings of different size. Features of the disk 214 can correspond to the features described above with reference to FIGS. 2 and 4.

By rotating the disk 214 about an axis 217, one of the openings 401-407 of the disk 214 can be positioned in front of the opening 215 of the discharge unit 211, so that it forms a discharge opening through which the milk can flow out of the container 201. The size of the discharge opening can be changed by positioning another of the openings 401-407 in front of the opening 215.

The axis 217 is passed through the bottom of the container 201 into a compartment 505 in which a motor 218, for example a stepping motor, is installed for rotating the disk 214 about the axis 217. The axis 217 can be supported by an axle bearing 501. By means of gears 502, 503, a reduction between the rotational speed of the motor 218 and the rotational speed the disk 214 can be provided, whereby a more exact positioning of the disk is possible, and a smaller force can be sufficient for moving the disk 214. By a sealing 550 on the axis 217 and below the disk 214, for example in the shape of an O-ring, an ingression of milk into the compartment 505 can substantially be prevented.

Between the gear 503 attached to the axis 217 and the axle bearing 501 or, alternatively to the axle bearing 501, another component part attached to the container 201, a pressure spring 504 can be mounted by which the gear 503 of the axle bearing 501 or the other component part are pushed away and the disk 214 is pressed onto the rim of the opening 215 of the discharge unit 211. Thereby, a good sealing between the disk 214 and the rim of the opening 215 can be achieved, so that no milk flows through between the disk 214 and the rim of the opening 215.

The container 201 has a predetermined vertical direction which is outlined in FIG. 5 by a dotted line designated with the reference numeral 507. During the operation of the apparatus 500, the apparatus 500 can be aligned such that the vertical direction 507 extends perpendicularly. With this alignment, a calibration of the apparatus 500 can be carried out.

In some embodiments, the side walls of the container 201 can be parallel to the vertical direction 507. For example, the container 201 can be cylindrical, and the vertical direction 507 can be defined by the direction of the cylinder axis.

A cross-sectional area of the interior space of the container 201 can be constant at least in a range of the container 201 between a minimum filling level which, at a regular operation of the apparatus 500, is not underachieved, and a maximum filling level which, at a regular operation of the apparatus 500, is not exceeded, what can be achieved, as described above with reference to FIGS. 2, 3 and 4, by means of an appropriate control of the size of the discharge opening by a correspondingly configured control unit.

In this respect, the cross-sectional area of the container is defined by the surface area of a region of a plane situated in the interior of the container 201, wherein the plane is perpendicular to the vertical direction 507 of the container 201.

The present invention is not limited to embodiments with perpendicular side walls of the container 201. In other embodiments, the side walls of the container 201 or parts thereof can also be curved relative to the vertical direction 507. In such embodiments, the vertical direction of the container 201 can, at a suitable shaping of the container, also be determined in a way that the cross-sectional area of the interior of the container can be constant in a range between the minimum and the maximum filling level.

In some embodiments, the axis 217 about which the disk 214 is rotatable, can be inclined to the vertical direction 507, wherein the vertical direction 507 and the axis 217 enclose an angle that is designated in FIG. 5 by the reference numeral 509. The angle 509 can here take a value in the range of approximately 2 to approximately 10 degrees.

Due to the inclination of the axis 217 to the vertical direction 507, part of the disk 214 lies below the centre of the disk 214 if the vertical direction 507 is perpendicularly oriented. The opening 215 of the discharge unit 211 can be disposed relative to the disk 214 such that the one of the openings 401-407 of the disk 214 which is momentarily placed in front of the opening 215 is situated below the centre of the disk. Thereby, a particularly deep position of the discharge opening of the container 201 can be achieved, favouring an efficient evacuation from the container 201.

The bottom face of the container can comprise an area 510 in which it is substantially perpendicular to the vertical direction 507. Another area 511 of the bottom face can be substantially parallel to the lower face of the disk 214. The opening 215 can be located in the area 511, and the rim of the opening can be disposed below the height of the area 510 which is represented in FIG. 5 by a dotted line 506. Thereby, with a perpendicular orientation of the vertical direction 507, the container 201 can be evacuated through the opening 215 and the opening 401-407 of the disk 214 disposed in front of it, so that the area 510 is no longer covered by milk. Thereby, residual milk in the container 201 after an evacuation of the container 201 can be reduced to a minimum when the milking process is finished.

The present invention is not limited to embodiments in which the opening 215 and the means 213 for changing the size of the discharge opening are located at the bottom of the container 201. In other embodiments, the opening 215 can also be disposed at a side wall of the container 201, and the axis of the disk 214 can be passed through the side wall of the container 201, so that it is perpendicular to the vertical direction 507. The opening 215 can be disposed below the axis 217 in order to reduce a residual amount of milk in the container 201, which cannot be evacuated through the opening 215 at a perpendicular orientation of the vertical direction 507.

The present invention is not limited to embodiments in which the means 213 for changing the size of the discharge opening comprise a rotatably supported disk with a plurality of openings, as described above with reference to FIG. 2 to 5.

In other embodiments, the means 213 for changing the size of the discharge opening can comprise two or more openings of the discharge unit 211, which can be opened individually and/or combined with each other, wherein the discharge opening is formed by one or a plurality of the openings which are opened. Such means 213 for changing the size of the discharge opening are described in the following with reference to FIG. 6a to 6c.

The means 213 can be used in an apparatus 600 for measuring a quantity of milk yielded by an animal during a milking process, whose further features can correspond to those of the above-described apparatuses 200, 500.

Figure 6A:
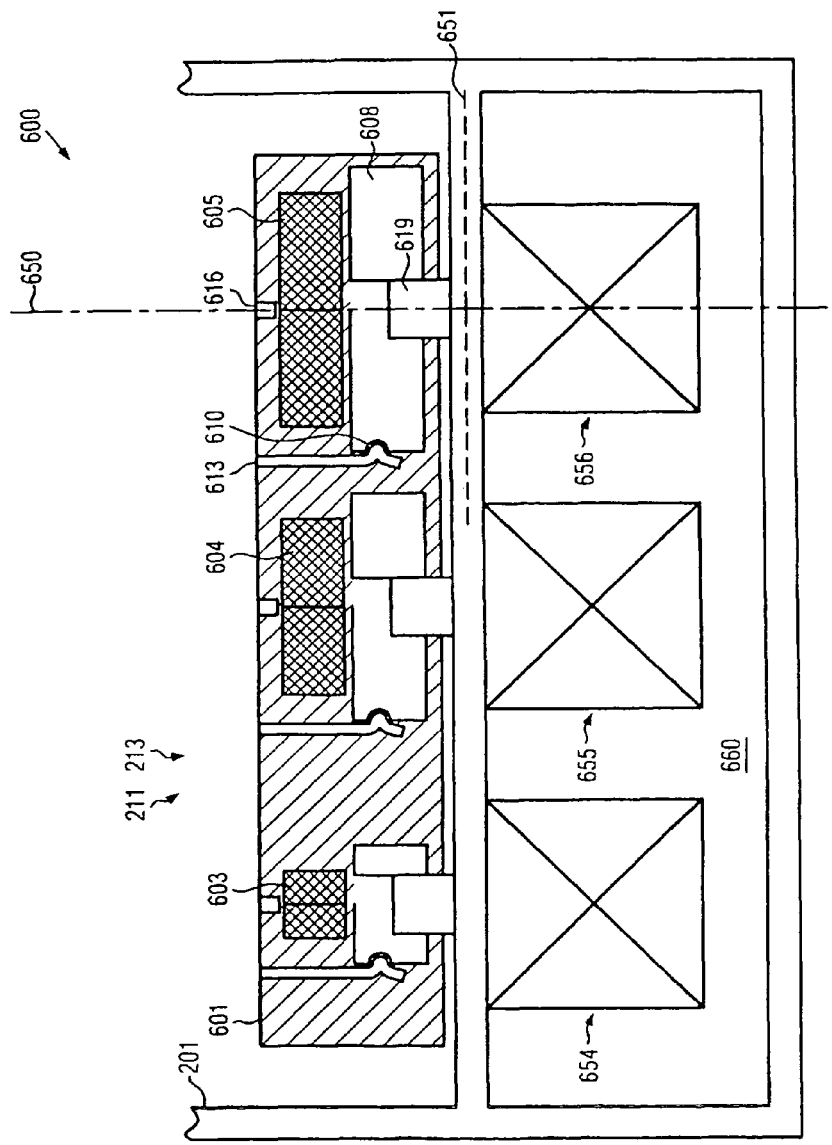
FIG. 6a shows a schematic top view of means for changing a size of a discharge opening in an apparatus according to an embodiment of the present invention.
Figure 6B:
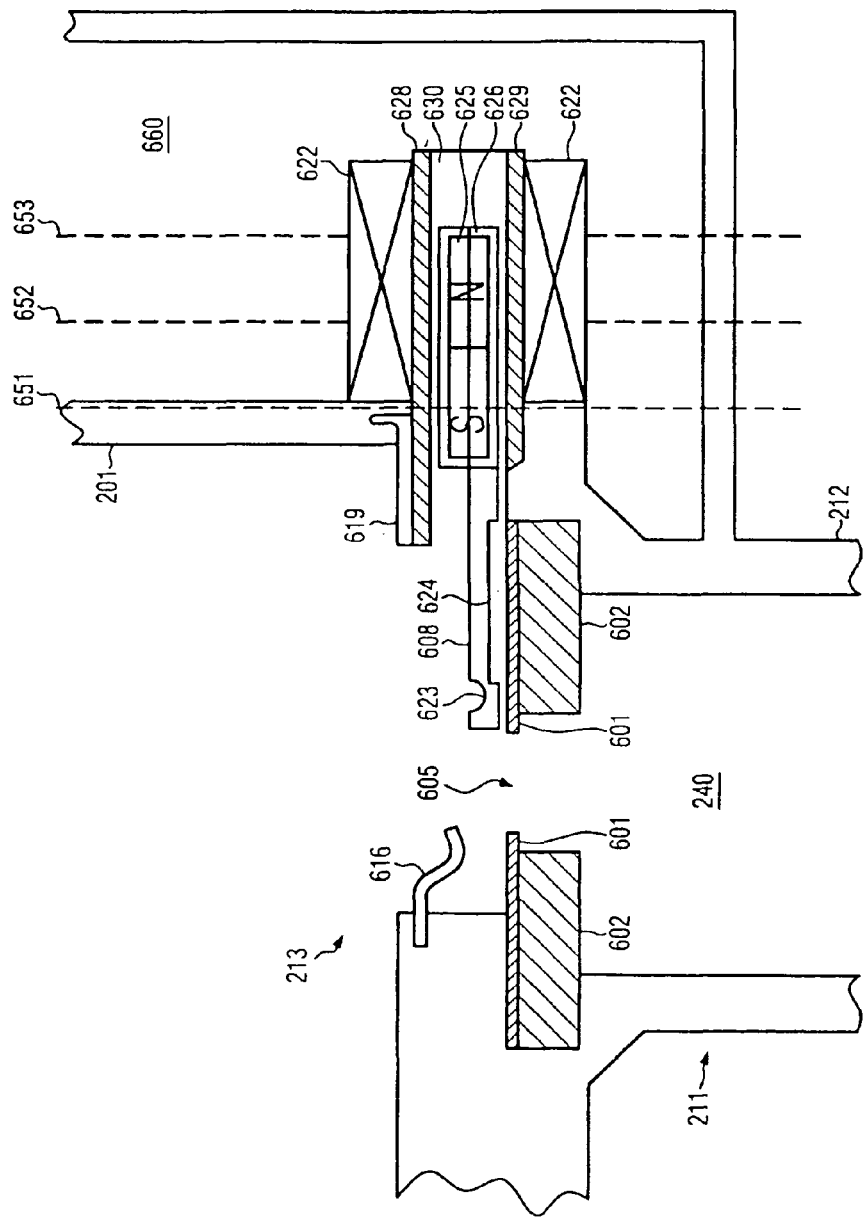
FIGS. 6b and 6c show schematic cross-sectional views of the means represented in FIG. 6a for changing the size of a discharge opening.
Figure 6C:
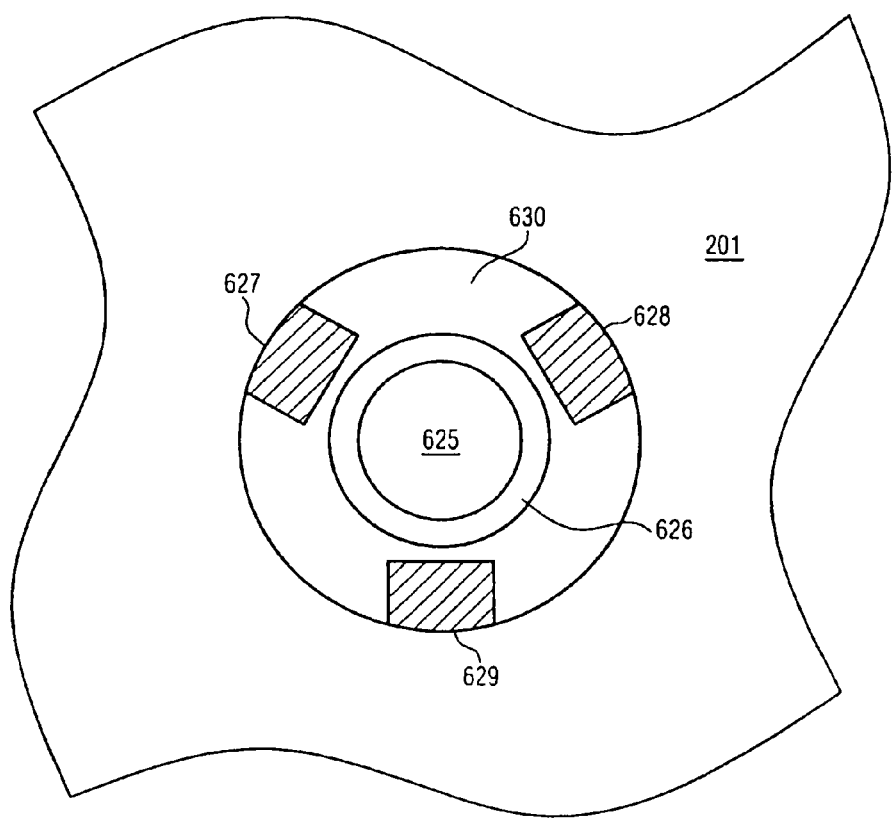

FIG. 6a shows a schematic top view of the means 213 for changing the size of a discharge opening from a vertical direction of a container 201 of the apparatus 600 for measuring a quantity of milk yielded by an animal during a milking process. FIG. 6b shows a schematic cross-sectional view along a plane 650 which is perpendicular to the drawing plane of FIG. 6a, and FIG. 6c shows a schematic cross-sectional view along a plane 651 which is perpendicular to the drawing plane of FIG. 6a as well as to the plane 650, and extends through a side wall of the container 201.

In the embodiment shown in FIG. 6a, the means 213 for changing the size of the discharge opening is provided in the bottom of the container 201. In other embodiments, however, the means 213 can also be provided in a side wall of the container 201.

The means 213 comprise a shut-off means 601 with a first opening 603, a second opening 604 and third opening 605, as well as a first closing mechanism 654, a second closing mechanism 655 and a third closing mechanism 656. The first closing mechanism 654 is adapted to expose and to close the first opening 603. Correspondingly, the second closing mechanism 655 and the third closing mechanism 656 are adapted to expose or to close the second opening 604 and the third opening 605, respectively.

The shut-off means 601 can in some embodiments comprise a metal plate with a thickness in the range of approximately 3 mm to approximately 6 mm. The shut-off means 601 can be mounted on a metal plate 602, for example by an adhesive. The metal plate 602 can have a greater thickness than the shut-off means 601 and comprise an opening below each of the openings 603, 604, said opening having larger dimensions than the openings 605, the 603, 604 and 605 disposed thereabove. Due to the metal plate 602, a distortion of the shut-off means 601 can be prevented or at least reduced. Due to this arrangement, a particularly thin shut-off means 601 can be realized which is, with regard to its flow characteristics, almost independent from the flow speed and can therefore be calibrated easier and is therefore particularly well suited for a largely uniform mass production.

The shut-off means 601 can be provided in the bottom or, in other embodiments, in a side wall of the container 201, and a collection chamber 240 can be positioned at a side of the shut-off means 601 facing away from the interior of the container 201. Thus, milk can flow from the interior of the container 201 through one or a plurality of the openings 201 that are exposed by the closing mechanisms 654, 655, 656 into the collection chamber 240.

Furthermore, similarly to the embodiments described above with reference to FIG. 2 to 5, a bypass line (not shown in FIG. 6a to 6c) can lead into the collection chamber 240, said bypass line being adapted to supply air which was separated from the milk in a centrifuge head, to the collection chamber 240, so that milk and air are mixed with each other in the collection chamber 240. Furthermore, a port 212 can lead to the collection chamber 240, said port being connectable to the milking line of a milking machine.

In some embodiments, the openings 603, 604, 605 can be dimensioned such that the milk flow through the opening 605 is approximately twice as much as the milk flow through the opening 604, and the milk flow through the opening 604 is approximately twice as much as the milk flow through the opening 603. The milk flows through the individual openings 603, 604, 605 can, as described above, depend on the filling level of the container 201. However, since the form of dependence of the milk flows from the filling level is substantially the same for all the openings 603, 604, 605, the relations between the milk flows through the openings 603, 604, 605 can be substantially independent from the filling level of the container 201. The relations between the milk flows through the openings 603, 604, 605 can be set by an adequate choice of the cross-sectional areas and of the form of the openings 603, 604, 605.

A control unit of the apparatus 600 can, in such embodiments, be adapted to control the closing mechanisms 654, 655, 656 in accordance with the digits of a binary number in the range of Zero to Seven. Herein, the first (smallest) opening 603 is opened, when the least significant digit of the binary number equals One, and is closed, when the least significant digit equals Zero. The third (largest) opening 605 is opened, when the most significant digit equals One, and is closed, when the most significant digit equals Zero. The second opening 604 is opened, when the medium digit equals One, and is closed, when the medium digit equals Zero.

If the binary number has the value Zero, consequently all three openings 603, 604, 605 are closed. If the binary number has the value Seven, all three openings 603, 604, 605 are opened. With values in the range of One to Six, respectively, a part of the openings 603, 604, 605 is opened and a part of the openings 603, 604, 605 is closed. The total milk flow through the openings 603, 604, 605 is substantially equal to a product of the value of the binary number and the milk flow through the smallest of the openings 603, 604, 605.

Those openings 603, 604, 605 which are momentarily open form a discharge opening through which the milk is discharged from the container 201 into the collection chamber 240. If more than one of the openings 603, 604, 605 is opened, the discharge opening consists of a plurality of sub-openings which are separated from each other by areas of the shut-off means 601 and/or by parts of the closing mechanisms 654, 655, 656, and the discharge opening is formed by the entirety of the plurality of momentarily opened openings 603, 604, 605. If only one of the openings 603, 604, 605 is opened, the discharge opening is formed by the momentarily opened opening among the openings 603, 604, 605.

If the binary number, corresponding to whose digits the closing mechanisms 654, 655, 656 are controlled, is increased or decreased by One, the milk flow through the discharge opening is enhanced or reduced, respectively, by a predetermined flow rate difference corresponding to the milk flow through the opening 603 when the opening 603 is open. The flow rate difference is here substantially equal for each initial value of the binary number.

Similarly to the embodiments as described above with reference to FIG. 2 to 5, a relation between a difference of a quantity of milk in the container 201 at a maximum filling level and a quantity of milk in the container 201 at a minimum filling level on the one hand and the flow rate difference on the other hand can be greater than 20 seconds, which can contribute to reduce the number of switching operations between an opened state and a closed state of the openings 603, 604, 605.

Similarly to the embodiments as described above with reference to FIG. 2 to 5, it can be valid for at least one or all of the adjustable sizes of the discharge opening that a range of milk flows in which, at the respective size of the discharge opening, a balance state with a filling level between the minimum and the maximum filling level can be established, is a sub-range of a range of approximately 0.5 kg/min to approximately 12 kg/min.

The present invention is not limited to embodiments in which three openings 603, 604, 605 are configured in a common shut-off means 601. In other embodiments, a plurality of shut-off means can be provided, in which one or a plurality of the openings 603, 604, 605 are configured.

Furthermore, the present invention is not limited to embodiments in which three openings 603, 604, 605 are provided. In other embodiments, a greater or smaller number of openings can be provided. The openings can comprise different sizes and be configured such that the milk flows through the openings are respectively equal to a product of the milk flow through the smallest opening and a power of two, and closing mechanisms which are associated with the openings can be controlled corresponding to the digits of a binary number in order to close some or all of the openings.

The present invention is, however, not limited to embodiments in which the openings are opened or closed according to the digits of a binary number. In other embodiments, a plurality of openings of different size can be provided, one of which is opened and the others are closed, respectively, or there can be provided a plurality of openings of the same size, and a milk flow can be controlled by changing the number of the openend openings.

In the following, the closing mechanism 656 for closing and exposing the third opening 605 will be explained in detail. The closing mechanisms 654, 655 for closing and exposing the first opening 603 and the second opening 604 can have a substantially identical configuration.

The closing mechanism 656 comprises a slide 608 which is movable between a first position, in which it covers and thus closes the opening 605, and a second position, in which it exposes the opening 605. The slide 608 can comprise a part 626 which is guided by rails 627, 628, 629 that are connected with the container 201, so that the slide 608 can be linearly moved along a guide direction which is parallel to the surface of the shut-off means 60 that faces the interior of the container 201. The part 626 of the slide 608 can have, in some embodiments, a substantially cylindrical form, and can be movable in the interior of a substantially cylindrical cavity 630.

The part 636 of the slide comprises a permanent magnet 625. A solenoid 622 is disposed such that, when current flows, it exerts a force on the permanent magnet 625 via the solenoid 622. Depending on the direction of the current flow, the permanent magnet 625 and the slide 608 connected therewith can be moved either towards the opening 605 in order to close it, or away from the opening 605 in order to expose it. The solenoid 622 can comprise a coil enclosing the part 626 of the slide 608, in which the permanent magnet 625 is located, in annular form.

When the slide 608 moves, it can slide on the surface the shut-off means 601. Due to a recess 624 at the side of slide 608 facing the shut-off means 601, a friction between the slide 608 and the shut-off means 601 can be reduced.

The cavity 630 extends through the side wall of the container 201 into the interior of a space 660 adjacent to the container 201, in which space the solenoid 622 is located and which can be, in some embodiments, the electronic compartment 301 (FIG. 3). The cavity 630 can comprise liquid-tight walls to prevent infiltration of liquid into the container, such as milk and/or cleaning liquid into the space 660.

The part 626 of the slide 608 can have an exterior diameter which is smaller than the inner diameter of the cavity 630, so that between the part 626 of the slide 608 and the walls of the cavity liquid can flow through, when the slide 608 moves. Thereby, a resistance that must be overcome when moving the slide 608 can be reduced, and the exchange of liquid can help to prevent soiling of the cavity 630.

At the side wall of the container 201, a guide extension 619 protruding into the interior of container 201 can be provided. Thereby, improved guiding of the slide 608 can be achieved, particularly when it is at or near the position at which it closes the opening 605.

In FIG. 6b, a first dotted line 652 designates a position of the end of permanent magnet 625 facing away from the interior of the container 201 in the position, in which the slide 608 covers the opening 605. A second line 653 designates a position of the end of permanent magnet 625 facing away from the interior of the container 201 in the position in which the slide 608 exposes the opening 605. The positions 652, 653 can respectively be at a distance of a third part of the length of the solenoid 622 from the end thereof. Thereby, a relatively strong force effect of the solenoid 622 on the permanent magnet 625 and, when current flows, a definite moving direction of the permanent magnet 625 through the solenoid 622 can be achieved.

The slide 608 can comprise a first notch 623 which, for example, can be disposed at an upper face of the slide 608 facing away from the shut-off means 601, and a second notch 610 which can be disposed, for example, at a side of the slide 608. On the container 201 a first spring 616 which, in the closed position of the slide 608, is in engagement with the first notch 623, and a second spring 613 which, in the opened position of the slide 608, is in engagement with the second notch 613, can be mounted. Thereby, the slide 608 can be retained in the opened position as well as in the closed position, so that it remains in its position when the current flowing through the solenoid 622 is switched off. Thus, a current flow through the solenoid 622 is only required for changing the position of the slide 608 (impulse magnet technique). Thereby, a power consumption of the apparatus 600 even at a relatively strong magnetic force can be kept very low, which can be an advantage particularly in a mobile operation with batteries.

In other embodiments, for retaining the slide, adequately positioned permanent magnets acting on the permanent magnet 625 of the slide 608 can be provided instead of the springs 613, 616.

The control unit 236 of the apparatus 600 can be connected with the closing mechanisms 654, 655, 656 and be adapted to control the closing mechanisms 654, 655, 656 for closing and exposing the openings 603, 604, 605. In embodiments, in which the closing mechanisms 654, 655, 656 are configured as described above, the control unit 236 can be adapted to control an electric current through the solenoids of the closing mechanisms 654, 655, 656.

In further embodiments, the closing mechanisms 654, 655, 656 can also be opened or closed pneumatically, for example through a diaphragm or a piston, individually or combined with each other.

In further embodiments, the means 213 can comprise a disk which is linearly movable along a guiding direction, wherein the at least two openings are disposed along the guiding direction, and a lower face of the disk is in contact with the rim of the opening 215 of the discharge unit 211. In such embodiments, the disk can take the form of a substantially rectangular strip with the at least two openings, and the guiding direction can extend in a lengthwise direction of the strip. The linear movement of the disk can be effected by means of a linear drive, for example by means of a permanent magnet and a solenoid which exerts a force on the permanent magnet when current flows through the solenoid, in a similar way to that described above with reference to the FIG. 6a to 6c.

In further embodiments, the size of the discharge opening can be continuously variable. Such an embodiment will be described in the following with reference to FIG. 7.

Figure 7:
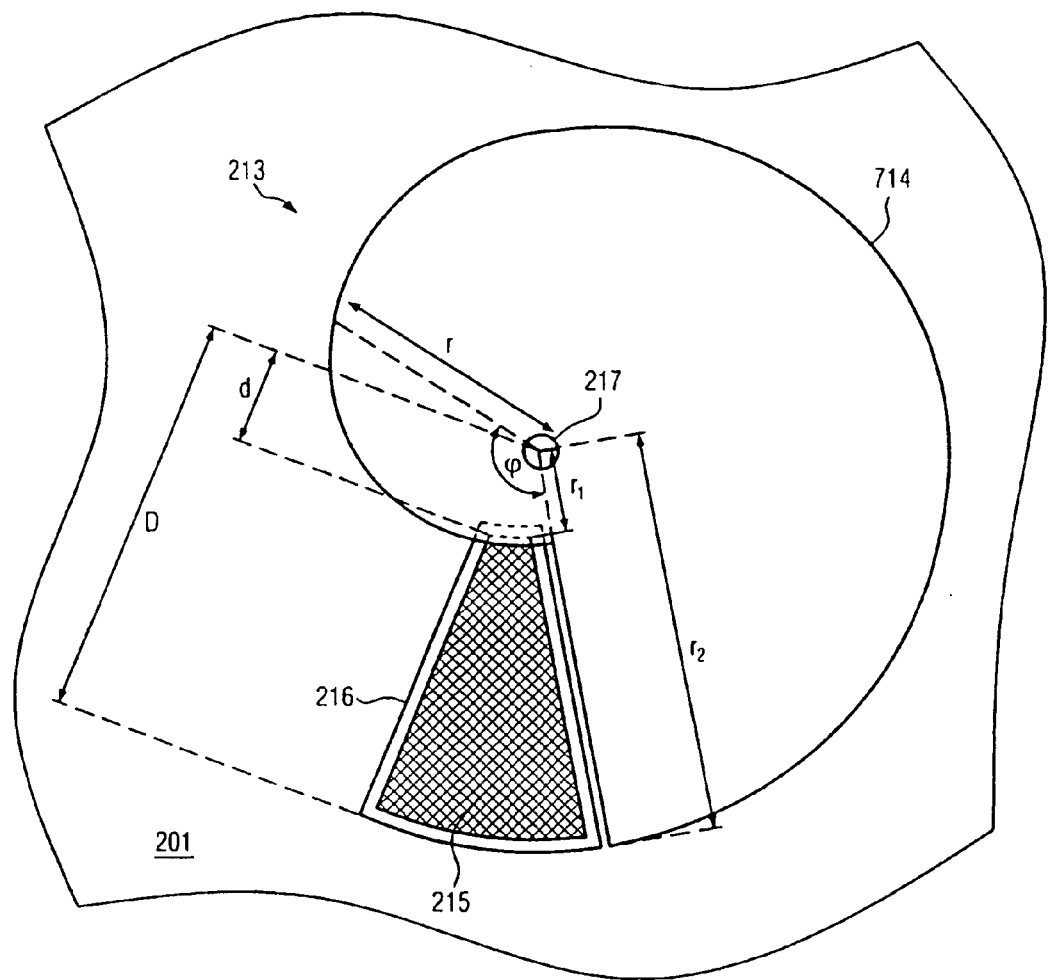
FIG. 7 shows a schematic top view of means for changing the size of a discharge opening in an apparatus according to an embodiment of the present invention.

FIG. 7 shows a schematic view of means 213 for changing the size of a discharge opening which, in some embodiments, can be used instead of the means 213 described above with reference to FIG. 2 to 5. The means 213 comprise a disk 714 which is rotatable about an axis 217, wherein features of the axis 217 can correspond to the axis 217 as described above with reference to the FIG. 2 to 5. In particular, the axis 217 can be connected with a disk driving means 218 which is adapted to rotate the disk 714 about the axis 217. In some embodiments, gears similar to the gears 502, 503 described above with reference to FIG. 5, an axle bearing similar to the axle bearing 501 described above with reference to FIG. 5, a sealing similar to the sealing 550 described above with reference to FIG. 5, and a spring for pressing the disk 714 onto the rim of the opening 215 similar to the spring 504 described above with reference to FIG. 5, can be provided.

A radius r of the disk 714 is dependent of an angle φ about the axis 217, wherein the radius r of a first radius $r_1$ at an angle φ of 0° increases to a second radius $r_2$ at an angle φ of 360°. Thereby, the outline of the disk 714 may take the shape of a snail shell. The radius r must not increase, as represented in FIG. 7, in the clockwise direction. In other embodiments, the radius r can also increase in a counterclockwise direction.

A distance d between the axis 217 and a part of the rim of the opening 215 of the discharge unit 211 at the side of the opening 215 facing the axis 217 can be greater or approximately equal to the first radius $r_1$, and a distance D between the axis 217 and a part of the rim the opening 215 facing away from the axis 217 can be smaller or approximately equal to the second radius $r_2$. Thereby, the opening 215, according to the position the disk 714, can be totally or partly covered by the disk 714, or the disk 714 can expose the opening 215.

The opening 215 or that part of the opening 215, respectively, that is not covered by the disk 714, forms a discharge opening through which the milk can flow out of the container 201. By rotating the disk 714, a size of the discharge opening between a opened position, in which an area of the disk 714 with a radius that is approximately equal to the first radius $r_1$ is located near the opening 215, and a closed position, in which an area of the disk 714 with a radius that is approximately equal to the second radius $r_2$, is located near and above the opening 215, can be continuously changed.

In some embodiments, the radius r of the disk 714 can have an exponential dependence on the angle φ, so that the rim of the disk 714 has substantially the form of a logarithmic spiral.

In other embodiments, an iris diaphragm, a cat's eye diaphragm or a cone inmergible into the opening 215 can be used in order to continuously change the size of the discharge opening.

In embodiments with a continuously variable size of the discharge opening a motor, which can be a stepping motor or a gear motor, can be used for changing the size of the discharge opening. Instead of a motor, a pneumatic or magnetic rotational or linear drive can also be used. The drive can be configured to provide a relatively high positioning accuracy in order to enable a reproducible setting of the size of the discharge opening over the whole range of values.

In embodiments of the present invention in which the size of the discharge opening is continuously adjustable, the milk flow through the discharge opening can be calibrated for a plurality of discrete values of the size of the discharge opening as a function of the filling level of the container 201. For example, in the embodiment described with reference to FIG. 7 the milk flow through the discharge opening can be calibrated for a plurality of rotation angles of the disk 714. For sizes of the discharge opening between these sizes, an interpolation among the milk flows determined for adjacent sizes of the discharge opening can be performed to determine the milk flow through the discharge opening. For the discrete values of the size of the discharge opening, the milk flow can be calculated, as described above with reference to FIG. 2 to 5, from the size of the discharge opening and the filling level.

In some embodiments, the openings 401 to 407 of the disk 214 or the openings 603, 604, 605, respectively, can have rims which are substantially vertical to the surface of the disk 214 or to the surface of the shut-off means 601, respectively. In comparison to embodiments in which the rims of the openings 401 to 407 or of the openings 603, 604, 605, respectively, are rounded, an improved measuring precision of the apparatus 200, 500, 600 can thereby be achieved since vertical and sharp-edged rims can be produced with particularly high precision. The rim of disk 714 described above with reference to FIG. 7 can also comprise vertical and sharp-edged rims.

During operation of the apparatuses 200, 500, the milk yielded by an animal during the milking process can be supplied via the supply unit 202 to the container 201. The filling level of the milk in the container 201 can be measured, as described above, by means of the filling level measuring device 219. In dependence on the measured filling level, the size of the discharge opening can be changed as described above, wherein the size of the discharge opening is set such that the filling level of the milk in the container 201 remains within a predetermined range, which can be determined by the minimum filling level and the maximum filling level or by threshold values. The milk flow into the container 201 and/or the total quantity of milk flown into the container 201 can be calculated, as described above, from the set size of the discharge opening and the measured filling level.

The invention claimed is:

1. An apparatus for measuring a quantity of milk yielded by an animal during a milking process, comprising
a container;
a supply unit configured to supply milk to the container and connectable to a milking unit of a milking machine;
a discharge unit configured to discharge milk from the container and connectable to a milking line of the milking machine which is adapted to have applied thereto a milking vacuum, wherein the discharge unit comprises means for changing the size of a discharge opening through which the milk flows when it is being discharged from the container and the discharge opening has at least two sizes which allow the milk to flow through the discharge opening and can be adjusted;
a filling level measuring device configured to measure a filling level of the milk in the container;
a control unit configured to control the means for changing the size of the discharge opening in dependence on the milk level in the container determined by the filling level measuring device, in order to adjust the size of the discharge opening such that the filling level remains within a predetermined range; and
an evaluation unit configured to calculate a milk flow into the container on the basis of the set size of the discharge opening and the filling level measured by the filling level measuring device.

2. The apparatus according to claim 1, wherein the control unit is configured to enlarge the discharge opening when the filling level of the container exceeds a predetermined upper threshold value, and to reduce the discharge opening when the filling level is lower than a predetermined lower threshold value, and wherein the control unit is configured to determine, on the basis of the milk flow calculated by the evaluation unit, when the upper threshold value is exceeded and/or the lower threshold value is not reached, whether in the one of the at least two sizes of the discharge opening a balance between the milk flow into the container and the milk flow out of the container is established and, if this is the case, to adjust this size of the discharge opening.

3. The apparatus according to claim 1, wherein the means for changing the size of the discharge opening are configured such that three or more different sizes of the discharge opening, which allow the milk to flow through, are adjustable.

4. The apparatus according claim 1, wherein at least one of the adjustable sizes of the discharge opening allowing the milk to flow through the discharge opening is adapted such that, at a milk flow into the container lying in a sub-range of a range of 0.5 kg/min to 12 kg/min, a balance is established between the milk flow into the container and the milk flow out of the container when the filling level lies in the predetermined range.

5. The apparatus according to claim 4, wherein each of the adjustable sizes of the discharge opening allowing the milk to flow through the discharge opening is adapted such that, at a milk flow into the container lying in a sub-range of a range of 0.5 kg/min to kg/min, a balance is established between the milk flow into the container and the milk flow out of the container when the filling level lies in the predetermined range.

6. The apparatus according to claim 1, wherein the means for adjusting the size of the discharge opening comprise:
a disk with at least two openings of different sizes, the disk being disposed in front of an opening of the discharge unit and being movable relative to the opening of the discharge unit such that, by moving the disk, each of the at least two openings of the disk can be placed in front of the opening of the discharge unit, so that the milk, when it is being discharged from the container, flows through one of the at least two openings of the disk placed in front of the opening of the discharge unit; and
a disk driving means for moving the disk relative to the opening of the discharge unit.

7. The apparatus according to claim 6, wherein the disk is rotatable about an axis perpendicular to a bottom face of the disk, the at least two openings of the disk are disposed around the axis, and the bottom face of the disk is in contact with a rim of the opening of the discharge unit.

8. The apparatus according to claim 7, wherein the container has a vertical direction, wherein at least in an area of the container between a filling height corresponding to a minimum filling level and a filling height corresponding to a maximum filling level, a cross-sectional area of an inner space of the container is constant in each plane which is perpendicular to the vertical direction and intersects the container within the area between the filling heights corresponding to the minimum filling level and to the maximum filling level, and wherein the axis about which the disk is rotatable is inclined relative to the vertical direction of the container.

9. The apparatus according to claim 8, wherein the axis about which the disk is rotatable is perpendicular to the vertical direction of the container.

10. The apparatus according to claim 6, wherein the disk comprises an area where no opening is provided, and wherein the disk is movable relative to the discharge unit such that said area of the disk where no opening is provided can be placed in front of the opening of the discharge unit by moving the disk in order to close the opening of the discharge unit.

11. The apparatus according to claim 10, wherein the area of the disk where no opening is provided is disposed adjacent to a largest one of the at least two openings.

12. The apparatus according to claim 6, wherein the disk comprises a plurality of openings whose size is configured such that, at a predetermined filling level of the container, flow rates of the milk through two respective adjacent openings differ from each other by a predetermined flow rate difference.

13. The apparatus according to claim 12, wherein a relation between a difference of a quantity of milk in the container at a maximum filling level and a quantity of milk in the container at a minimum filling level on the one hand and the flow rate difference on the other hand is greater than 20 seconds.

14. The apparatus according to claim 1, wherein the means for changing the size of the discharge opening comprise a shut-off means with an adjustable opening degree.

15. The apparatus according to claim 1, wherein the means for changing the size of the discharge opening comprise:
two or more openings of the container; and
two or more closing mechanisms, each of the closing mechanisms being adapted to close and expose an opening associated with the closing mechanism;
the discharge opening being formed by all the exposed openings of the container; and
wherein the control unit is adapted to control the closing mechanisms in order to adjust the size of the discharge opening by closing and/or exposing one or more of the openings of the container.

16. The apparatus according to claim 1, wherein the means for changing the size of the discharge opening comprise: a disk rotatable about an axis perpendicular to a bottom face of the disk, said axis being disposed adjacent to an opening of the discharge unit, wherein a radius of the disk from the axis to the rim of the disk increases, as a function of an angle about the axis, from a first value which is smaller than or equal to a distance from the axis to a rim of the opening of the discharge unit at the side facing the axis, to a second value which is greater than or equal to a distance from the axis to a rim of the opening of the discharge unit at the side facing away from the axis.

17. The apparatus according to claim 1, comprising additionally an inclination sensor, the evaluation unit being adapted to perform a correction of the calculated milk flow on the basis of an inclination measured by the inclination sensor.

18. The apparatus according to claim 1, in which the supply unit comprises a centrifuge head for separating milk and transport air, wherein an inlet of the centrifuge head is connectable to the milking unit of the milking machine and a milk outlet of the centrifuge head leads into the container, and wherein the apparatus further comprises a bypass line configured to supply air from the centrifuge head along a side facing away from the container to the discharge opening of the discharge unit.

19. The apparatus according to claim 1, wherein the discharge unit comprises a collection chamber comprising a first inlet connected to the discharge opening, a second inlet connected to the bypass line and an outlet connectable to the milking line of the milking machine, said apparatus comprising a device for closing the outlet.

20. The apparatus according to claim 1, wherein, for calculating the milk flow into the container, the evaluation unit is adapted to determine a temporal change of the quantity of milk in the container on the basis of a temporal change of the filling level, to determine a discharge rate out of the container on the basis of the size of the discharge opening and of the filling level, and to calculate a sum of the temporal change of the quantity of milk in the container and of the discharge rate.

21. The apparatus according to claim 1, wherein the evaluation unit is also adapted to determine a total amount of milk yielded by the animal during the milking process by temporal integration of a milk flow from the container, calculated on the basis of the size of the discharge opening and the filling level.

22. The apparatus according to claim 1, wherein the filling level measuring device comprises:
a pitot tube having an open bottom end which is located in the interior of the container below a filling height corresponding to a minimum filling level of the container;
a gas supply conduit configured to introduce a gas into the pitot tube so that the gas is discharged from the pitot tube at its bottom end; and
a pressure measuring device configured to measure a differential pressure between the interior of the pitot tube and an area of the container above a filling height corresponding to a maximum filling level.

23. The apparatus according to claim 22, wherein the pressure measuring device comprises:
a differential pressure sensor configured to measure a differential pressure between a first portion of the differential pressure sensor and the second portion of the differential pressure sensor;
a first conduit connecting the interior of the pitot tube with the first portion of the differential pressure sensor; and
a second conduit connecting the area of the container above the filling height corresponding to the maximum filling level with the second portion of the differential pressure sensor.

24. The apparatus according to claim 23, wherein the one end of the first conduit in the interior of the pitot tube and/or one end of the second conduit in the interior of the container has a drip projection.

25. The apparatus according to claim 23, wherein, in the first conduit to the differential pressure sensor and/or in the second conduit to the differential pressure sensor, a diaphragm made of a material that is permeable to gas and impermeable to liquids is installed.

26. The apparatus according to claim 23, further comprising a heating device for heating the differential pressure sensor.

* * * * *